US009069164B2

(12) United States Patent
Starner et al.

(10) Patent No.: US 9,069,164 B2
(45) Date of Patent: *Jun. 30, 2015

(54) METHODS AND SYSTEMS FOR A VIRTUAL INPUT DEVICE

(75) Inventors: Thad Eugene Starner, Mountain View, CA (US); Liang-Yu (Tom) Chi, San Francisco, CA (US); Luis Ricardo Prada Gomez, Hayward, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/533,120

(22) Filed: Jun. 26, 2012

(65) Prior Publication Data

US 2013/0016070 A1    Jan. 17, 2013

Related U.S. Application Data

(63) Continuation of application No. 13/181,238, filed on Jul. 12, 2011, now Pat. No. 8,228,315.

(51) Int. Cl.
*G06F 3/042* (2006.01)
*G02B 27/01* (2006.01)
(Continued)

(52) U.S. Cl.
CPC ........ *G02B 27/017* (2013.01); *G02B 2027/014* (2013.01); *G02B 2027/0187* (2013.01);
(Continued)

(58) Field of Classification Search
None
See application file for complete search history.

(56) References Cited

U.S. PATENT DOCUMENTS 5,457,454 A    10/1995  Sugano
6,266,048 B1    7/2001  Carau, Sr.
(Continued)

FOREIGN PATENT DOCUMENTS

KR    1020110049162    5/2011
WO    WO02/50762    6/2002
(Continued)

OTHER PUBLICATIONS

Perez, C.A.; Pena, C.P.; Holzmann, C.A.; Held, C.M.; , "Design of a virtual keyboard based on iris tracking," Engineering in Medicine and Biology, 2002. 24th Annual Conference and the Annual Fall Meeting of the Biomedical Engineering Society EMBS/BMES Conference, 2002. Proceedings of the Second Joint , vol. 3, No., pp. 2428-2429 vol. 3, Oct. 23-26, 2002 [retrieved from the Internet on Jun. 26, 2011 from    URL:    http://ieeexplore.ieee.org/stamp/stamp.jsp?tp=&arnumber=1053358&isnumber=22474].
(Continued)

*Primary Examiner* — William Boddie
*Assistant Examiner* — Carolyn R Edwards
(74) *Attorney, Agent, or Firm* — McDonnell Boehnen Hulbert & Berghoff LLP

(57) ABSTRACT

The present application discloses systems and methods for a virtual input device. In one example, the virtual input device includes a projector and a camera. The projector projects a pattern onto a surface. The camera captures images that can be interpreted by a processor to determine actions. The projector may be mounted on an arm of a pair of eyeglasses and the camera may be mounted on an opposite arm of the eyeglasses. A pattern for a virtual input device can be projected onto a "display hand" of a user, and the camera may be able to detect when the user uses an opposite hand to select items of the virtual input device. In another example, the camera may detect when the display hand is moving and interpret display hand movements as inputs to the virtual input device, and/or realign the projection onto the moving display hand.

19 Claims, 13 Drawing Sheets

(51) Int. Cl.

| | |
|---|---|
| *G06F 3/01* | (2006.01) |
| *H04N 9/31* | (2006.01) |
| *G06F 3/0488* | (2013.01) |
| *G03B 17/54* | (2006.01) |
| *G03B 21/20* | (2006.01) |
| *G03B 29/00* | (2006.01) |

(52) U.S. Cl.
CPC .............. *G06F3/0426* (2013.01); *G03B 17/54* (2013.01); *G03B 21/2033* (2013.01); *G03B 29/00* (2013.01); *G06F 3/01* (2013.01); *H04N 9/3185* (2013.01); *H04N 9/3194* (2013.01); *G06F 3/017* (2013.01); *G06F 3/04886* (2013.01)

(56) References Cited

U.S. PATENT DOCUMENTS

| | | | |
|---|---|---|---|
| 6,512,838 | B1 * | 1/2003 | Rafii et al. ................. 382/106 |
| 6,771,294 | B1 * | 8/2004 | Pulli et al. ................. 715/863 |
| 6,911,972 | B2 | 6/2005 | Brinjes |
| 7,170,492 | B2 | 1/2007 | Bell |
| 7,173,605 | B2 | 2/2007 | Fong et al. |
| 7,259,747 | B2 | 8/2007 | Bell |
| 7,333,090 | B2 * | 2/2008 | Tanaka et al. ................. 345/158 |
| 7,348,963 | B2 | 3/2008 | Bell |
| 7,369,584 | B2 | 5/2008 | Goldman et al. |
| 7,536,032 | B2 | 5/2009 | Bell |
| 7,774,075 | B2 | 8/2010 | Lin |
| 7,869,204 | B2 | 1/2011 | Bair et al. |
| 2003/0099470 | A1 * | 5/2003 | Tseng ................. 396/61 |
| 2003/0174125 | A1 | 9/2003 | Torunoglu et al. |
| 2004/0196252 | A1 * | 10/2004 | Kim ................. 345/102 |
| 2005/0020910 | A1 * | 1/2005 | Quadling et al. ................. 600/424 |
| 2005/0094110 | A1 * | 5/2005 | Nakamura ................. 353/85 |
| 2005/0195372 | A1 * | 9/2005 | Ohara ................. 353/69 |
| 2006/0007056 | A1 | 1/2006 | Ou |
| 2006/0050062 | A1 | 3/2006 | Ozawa et al. |
| 2006/0232558 | A1 | 10/2006 | Chien |
| 2006/0285089 | A1 * | 12/2006 | Higashi ................. 353/101 |
| 2008/0018591 | A1 | 1/2008 | Pittel et al. |
| 2009/0009484 | A1 * | 1/2009 | Yu et al. ................. 345/173 |
| 2009/0033623 | A1 | 2/2009 | Lin |
| 2009/0153468 | A1 | 6/2009 | Ong et al. |
| 2009/0168027 | A1 | 7/2009 | Dunn et al. |
| 2009/0267921 | A1 | 10/2009 | Pryor |
| 2010/0079468 | A1 | 4/2010 | Pance et al. |
| 2010/0177035 | A1 | 7/2010 | Schowengerdt et al. |
| 2010/0199232 | A1 * | 8/2010 | Mistry et al. ................. 715/863 |
| 2010/0214267 | A1 | 8/2010 | Radivojevic et al. |
| 2011/0006991 | A1 | 1/2011 | Elias |
| 2012/0062445 | A1 * | 3/2012 | Haddick et al. ................. 345/8 |

FOREIGN PATENT DOCUMENTS

| | | |
|---|---|---|
| WO | WO03/001722 | 1/2003 |
| WO | WO2005/064439 | 7/2005 |

OTHER PUBLICATIONS

Craig Crossman, "Laser keyboard will put you in limelight" The Seattle Times, Jul. 31, 2006 [retrieved from the Internet on Jun. 26, 2011 from URL: http://community.seattletimes.nwsource.com/archive/?date=20060731&slug=btsoho31].

Huan Du, Thierry Oggier, Felix Lustenberger, Edoardo Charbon "A Virtual Keyboard Based on True-3D Optical Ranging" 2008 [retrieved from the internet on Jun. 27, 2011 from URL: http://citeseerx.ist.psu.edu/viewdoc/download?doi=10.1.1.94.8356&rep=rep1&type=pdf].

Tachi, "Telexistence and Retro-Reflective Projection Technology (RPT)", Proceedings of the 5th Virtual Reality International Conference, Laval Virtual, France, May 13-18, 2003, pp. 69/1-69/9.

Harrison et al., "Skinput: Appropriating the Body as an Input Surface", CHI 2010, Apr. 10-15, 2010, Atlanta, Georgia.

Starner et al., "Augmented Reality Through Wearable Computing", http://www.cc.gatech.edu/~thad/p/journal/augmented-reality-through-wearable-computing.pdf, 1997.

Ashbrook et al., "Experiments in Interaction Between Wearable and Environmental Infrastructure Using the Gesture Pendant", http://www.cc.gatech.edu/~thad/p/031_30_Gesture/hcii2001-gesture_pendant.pdf, 2001.

Sixth Sense MIT Media Lab video, [retrieved from the internet on Jul. 12, 2011 from URL: http://www.pranavmistry.com/projects/sixthsense/].

Microsoft Kinect Device, [retrieved from the internet on Jul. 12, 2011 from URL: www.xbox.com/kinect].

www.lightglove.com [retrieved from the internet on Jul. 12, 2011 from URL: www.lightglove.com].

"Apple Mages Workings on Augmented Reality Magic," Patently Apple, Dec. 14, 2009, pp. 1-10, http://www.patentlyapple.com/patently-apple/2009/12/apple-mages-working-on-augmented-reality-magic.html.

Harrison, Chris et al., Skinput: Appropriating the Body as an Input Surface, CHI2010, Atlanta, GA, Apr. 10, 2010.

International Search Report and Written Opinion for Int. App. No. PCT/US2012/044574, completed Feb. 1, 2013.

Extended European Search Report issued in co-pending EP Patent Application No. 12810718.2, European Patent Office, dated Feb. 4, 2015.

Inami et al., "Visuo-Haptic Display Using Head-Mounted Projector", Virtual Reality 2000, Proceedings IEEE, New Brunswick, NJ, Mar. 18, 2000, pp. 233-240.

Karitsuka et al., "A Wearable Mixed Reality with an On-Board Projector", Proceedings—The Second IEEE and ACM International Symposium on Mixed and Augmented Reality, Oct. 7, 2003, pp. 321-322.

Wilson et al., "Combining Multiple Depth Cameras and Projectors for Interactions ON, Above, and Between Surfaces", Proceedings of the 23rd Annual ACM Symposium on User Interface Software and Technology, Jan. 1, 2010, pp. 273-282.

* cited by examiner

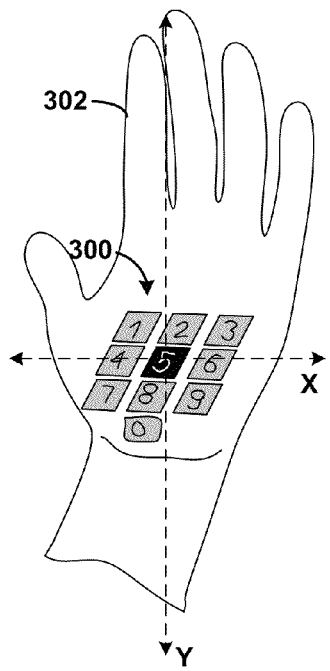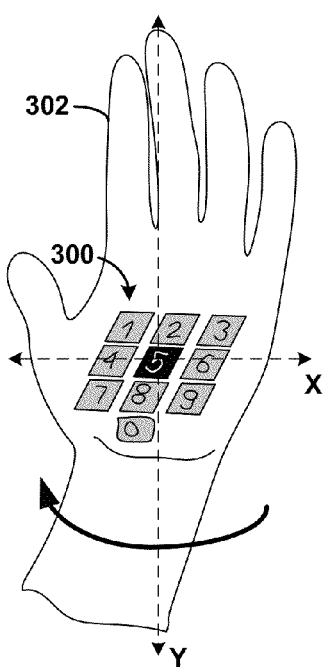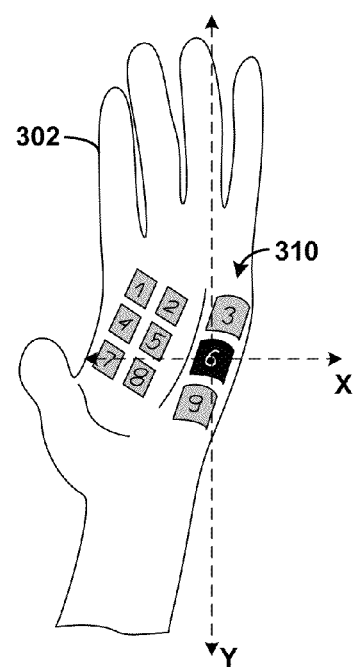
FIG. 7A  FIG. 7B  FIG. 7C
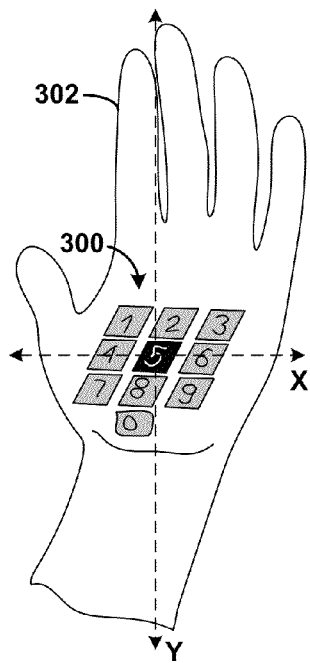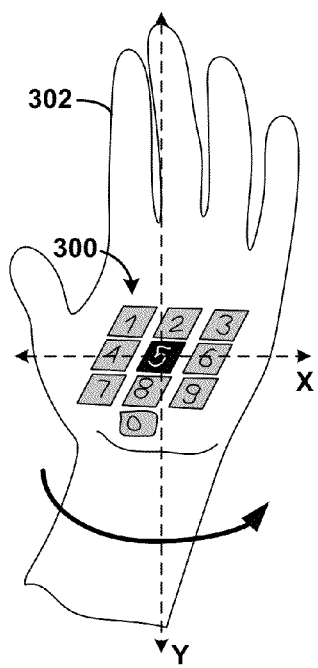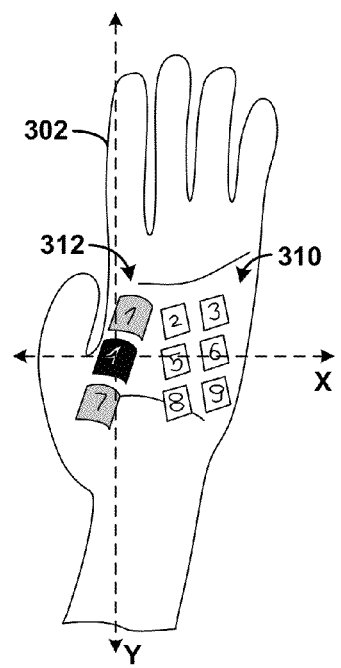
FIG. 8A  FIG. 8B  FIG. 8C

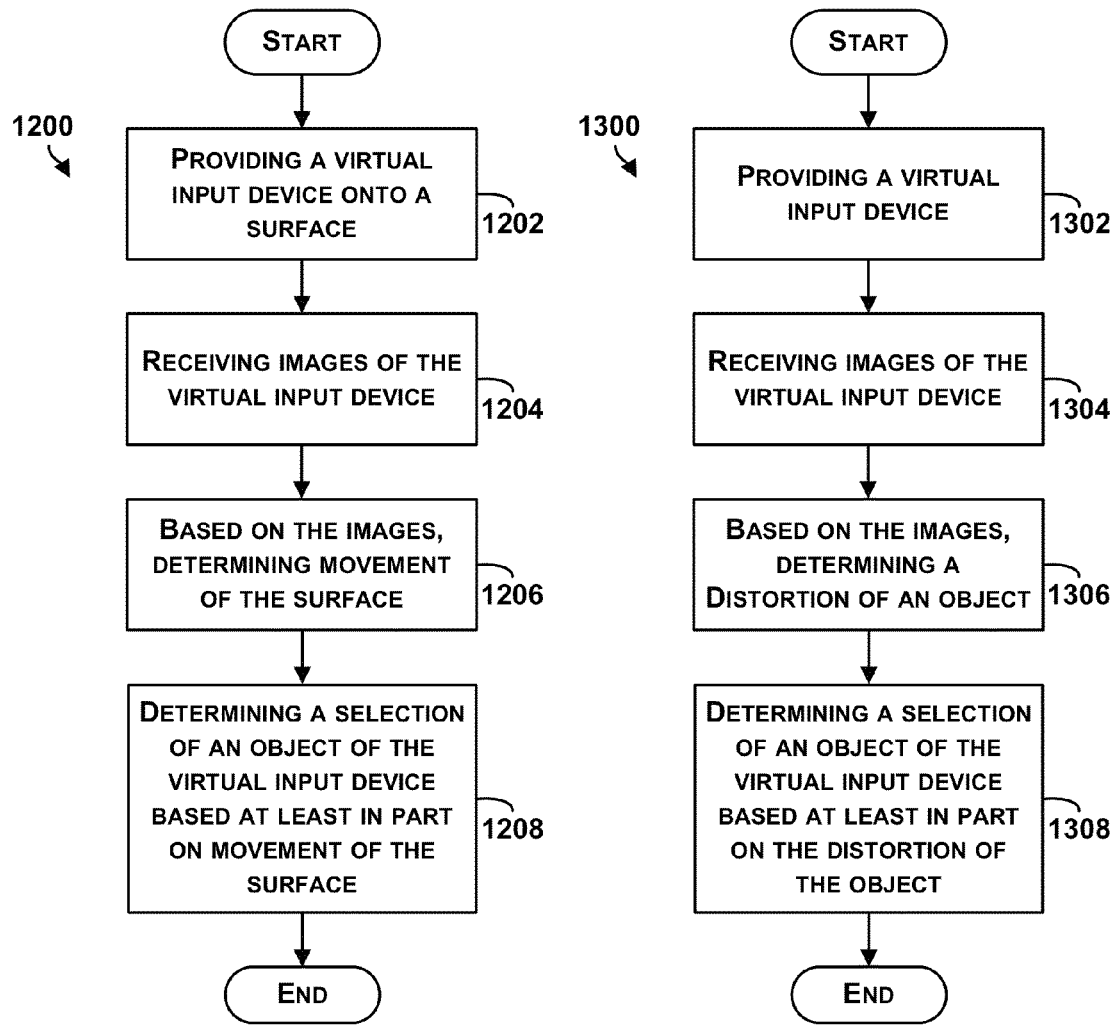

METHODS AND SYSTEMS FOR A VIRTUAL INPUT DEVICE

CROSS REFERENCE TO RELATED APPLICATION

The present application is a continuation of U.S. patent application Ser. No. 13/181,238, filed on Jul. 12, 2011, and entitled "Methods and Systems for a Virtual Input Device," which is herein incorporated by reference as if fully set forth in this description.

BACKGROUND

A projection keyboard is a virtual keyboard that can be projected onto a surface and components of the keyboard detect finger movements and translate the movements into keystrokes on a device. A projection keyboard unit generally includes a laser to project a visible virtual keyboard onto a surface (e.g., a red diode laser as a light source to project a full size QWERTY layout keyboard, with a size of 295 mm×95 mm projected at a distance of 60 mm from the projection keyboard unit), and a sensor or camera to sense finger movements. A location or detected co-ordinates of the finger can be used to determine actions or characters to be generated.

A projection keyboard may also use a second (invisible infrared) beam projected above the virtual keyboard. In this example, as a finger makes a keystroke on the virtual keyboard, the finger breaks the infrared beam and infrared light is reflected back to a camera. Reflected infrared beam may pass through an infrared filter to the camera, and the camera can photograph an angle of incoming infrared light. A sensor may determine where the infrared beam was broken, and detected coordinates can be used to determine actions or characters to be generated.

A projection keyboard may include use of a micro-controller to receive positional information corresponding to reflected light or light flashes from the sensor, and to interpret events to be communicated through an appropriate interface to external devices. Events may include a key stroke, mouse movement or touchpad control.

SUMMARY

This disclosure may disclose, inter alia, methods and systems for a virtual input device. In one example, a system for a virtual input device is provided that comprises a projector, a camera, and a processor. The projector is configured to provide a virtual input device onto a surface and the virtual input device comprises a pattern of objects. The camera is configured to capture images of the virtual input device and to capture images of the surface, and the processor is configured to receive the images of the virtual image device and the images of the surface and to determine an approximate location of the surface. The processor may be further configured to instruct the projector to modify a projection of the virtual input device based on the approximate location of the surface, and to determine that the virtual input device is in use when the processor determines images of the virtual input device having a brightness above a predetermined threshold.

In another example, a method for operation of a virtual input device is provided. The method comprises providing a virtual input device onto a surface, and the virtual input device comprises a pattern of objects. The method also comprises receiving images of the virtual input device, and based on the images, determining an approximate location of the surface. The method further comprises modifying a projection of the virtual input device based on the approximate location of the surface, and determining that the virtual input device is in use when the processor determines images of the virtual input device having a brightness above a predetermined threshold.

In still another example, an article of manufacture including a tangible computer-readable media having computer-readable instructions encoded thereon is provided. The computer-readable media includes instructions for providing a virtual input device onto a surface, and the virtual input device comprises a pattern of objects. The computer-readable media also includes instructions for receiving images of the virtual input device, and instructions for based on the images, determining an approximate location of the surface. The computer-readable media further includes instructions for modifying a projection of the virtual input device based on the approximate location of the surface, and determining that the virtual input device is in use when the processor determines images of the virtual input device having a brightness above a predetermined threshold.

In yet another example, a system is provided comprising means for providing a virtual input device onto a surface, and the virtual input device comprising a pattern of objects. The system also comprises means for capturing images of the virtual input device, means for receiving the images, means for modifying a projection of the virtual input device based on the approximate location of the surface, and means for determining that the virtual input device is in use when the processor determines images of the virtual input device having a brightness above a predetermined threshold.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the Figures,

FIGS. 7A-7C illustrate example rotation movements of a projection surface;

FIGS. 8A-8C illustrate additional examples of rotation movements of a projection surface;

FIG. 12 is a block diagram of an example method for operation of a virtual input device, in accordance with at least some embodiments described herein;

FIG. 13 is a block diagram of another example method for operation of a virtual input device, in accordance with at least some embodiments described herein;

DETAILED DESCRIPTION

Figure 1:
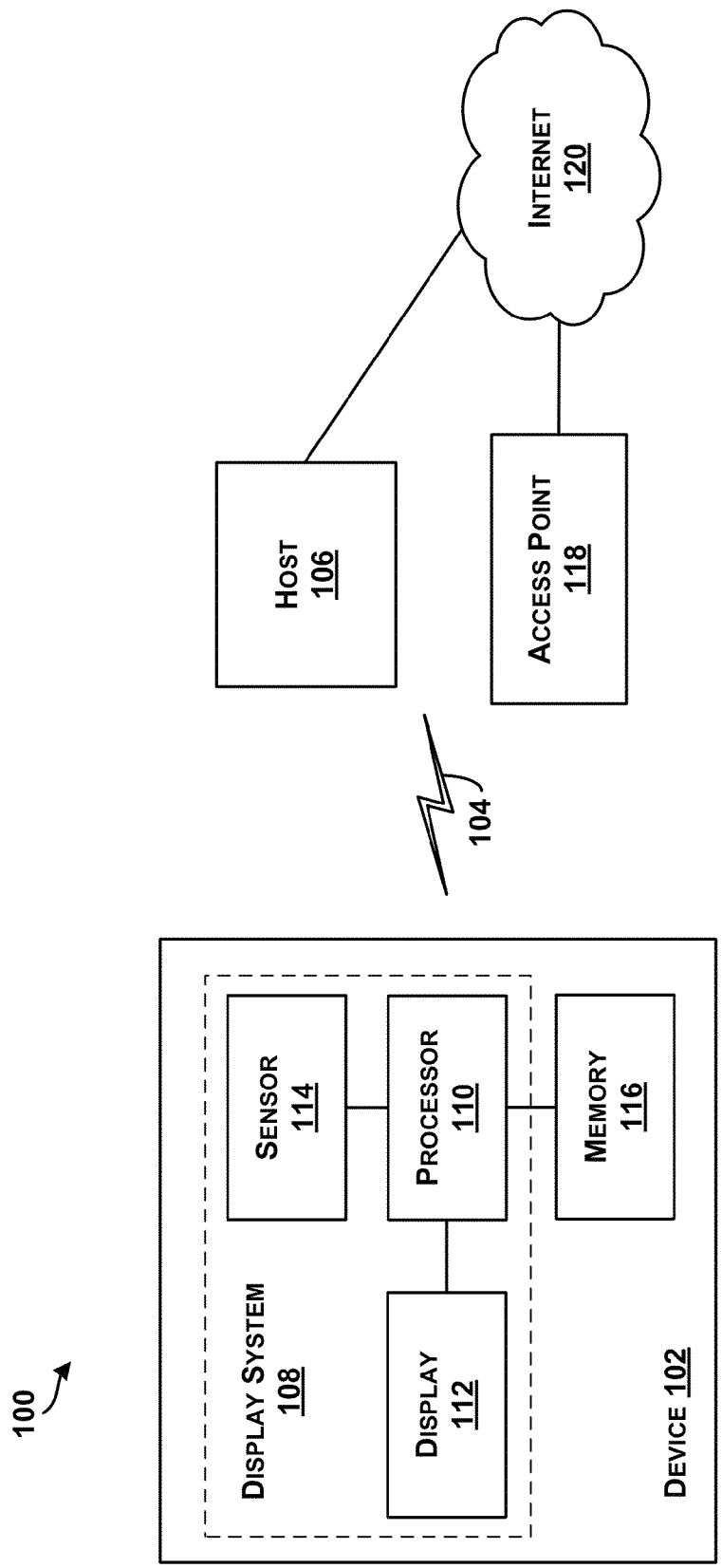
FIG. 1 illustrates an example system for transmitting and receiving data.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for a virtual input device. Briefly stated, in one example, a virtual input device (or keyboard) is described that includes a laser projector and a camera. The projector projects a laser onto a surface. The laser may be projected in any number of patterns or graphical user interfaces (GUI) including a keyboard. A camera may capture images that can be interpreted by a processor (e.g., using computer vision techniques) to determine pressing keys of the keyboard, for example.

In an example, the laser projector may be mounted on an arm of a pair of eyeglasses and the camera may be mounted on an opposite arm of the eyeglasses. The processor may further be mounted on the eyeglasses and coupled to the laser projector and/or camera. A laser pattern for a virtual input device can be projected onto a hand of the user, and the user may use an opposite hand to select items of the virtual input device. For example, the laser pattern may be projected onto a "display hand", and the camera may be able to detect when the user uses the opposite hand and the laser hits an "action finger" of the opposite hand that is making a selection.

In another example, the processor may detect when the display hand is moving and interpret display hand movements as inputs to the virtual input device. For example, when the display hand is tilted, the laser pattern is changed, and the change in the laser pattern can be identified. As the display hand is tilted away from the user, an image in the laser pattern on a far edge of the hand will be smaller than an image in the laser pattern on a close edge of the hand. Similarly, if the display hand is rotated, an edge of the hand closest to the projector displays objects larger, and an edge farther away from the projector displays objects smaller. Movement of the display hand (e.g., tilt and rotation) can be determined and accepted as a user selection. In one example, movement of the display hand can be interpreted similar to user inputs received from a mouse on a standard computer. Rotation can be interpreted as a horizontal (x-axis) movement, and tilt can be interpreted as a vertical (y-axis) movement.

In still another example, the processor may detect when the display hand is moving and may instruct the laser projector to adjust a projection of the virtual input device based on the movement so as to track the moving display hand. The processor may be further configured to determine that the virtual input device is in use when the processor determines that images of the virtual input device have a brightness above a predetermined threshold.

Referring now to FIG. 1, an example system 100 for transmitting and receiving data is illustrated. The system 100 includes a device 102 that communicates using a communication link 104 (e.g., a wired or wireless connection) to a host 106.

The device 102 may be any type of device that can receive data and display information corresponding to or associated with the data. For example, the device 102 may be a heads-up display system, such as glasses or any type of near eye display unit containing a display apparatus (e.g., a helmet, contact lens, and goggles). Further example embodiments may include a head-mounted display (HMD), a display comprising a liquid crystal display (LCD), light emitting diodes (LEDs), a molded polymer display, or a free space reflection display, or other means of image generation, for example. Additional example embodiments may include a waveguide in the display for generating images in front of the user's eyes, or a wearable computer including an HMD with a binocular display or a monocular display.

Thus, the device 102 may include a display system 108 comprising a processor 110 and a display 112. The display 112 may be, for example, an optical see-through display, an optical see-around display, or a video see-through display. The display system 108 may be configured to communicate (e.g., receive and transmit data wired or wirelessly) with the host 106. The processor 110 may receive data from the host 106, and configure the data for display on the display 112. The processor 110 may be any type of processor, such as a micro processor, a digital signal processor (DSP), etc., and the display 112 may be any type of display including LCD, plasma, etc.

In addition, the device 102 may include one or more sensors, such as sensor 114, coupled to the processor 110. The sensor 114 may be a gyroscope or an accelerometer to measure movement of the device 102. The sensor 114 may further include any of Global Positioning System (GPS) receivers, infrared sensors, optical sensors, biosensors, Radio Frequency identification (RFID) systems, wireless sensors, and/or compasses, among others, for example. The sensor 114 may also take the form of a camera, and movement of the device can be determined based on optical flow or computer vision (e.g., using images from the camera to determine motion), for example.

Furthermore, the device 102 may include an integrated user-interface (UI) that allows a user to interact with the device 102. For example, the device 102 may include various buttons and/or a touchscreen interface that allow a user to provide input. As another example, the device 102 may include a microphone configured to receive voice commands from a user. Furthermore, the device 102 may include one or more interfaces that allow various types of user-interface devices to be connected to the device 102.

The device 102 may further include on-board data storage, such as memory 116 coupled to the processor 110. The memory 116 may store software that can be accessed and executed by the processor 110, for example.

The host 106 may be any type of computing device or transmitter including a laptop computer, a mobile telephone, etc., that is configured to transmit data to the device 102. The host 106 and the device 102 may contain hardware to enable the communication link 104, such as processors, transmitters, receivers, antennas, etc.

In FIG. 1, the communication link 104 is illustrated as a wireless connection; however, wired connections may also be used. For example, the communication link 104 may be a wired link via a serial bus such as USB, or a parallel bus. A wired connection may be a proprietary connection as well. The communication link 104 may also be a wireless connection, such as Bluetooth, IEEE 802.11 (IEEE 802.11 may refer to IEEE 802.11-2007, IEEE 802.11n-2009, or any other IEEE 802.11 revision), or other wireless based communication links.

In another example, the system 100 includes an access point 118 through which the device 102 may communicate with the internet 120. In this example, the device 102 may not require connectivity to the host 106. The access point 118 may take various forms. For example, if the device 102 connects using 802.11 or via an Ethernet connection, the access point 118 may take the form of a wireless access point (WAP) or wireless router. As another example, if the device 102 connects using a cellular air-interface protocol, such as a CDMA or GSM protocol, the access point 118 may be a base station in a cellular network that provides Internet connectivity via the cellular network.

As such, the device 102 may include a wired or wireless network interface through which the device 102 can connect to the access point 118. As an example, the device 102 may be configured to connect to access point 118 using one or more protocols such as 802.11, 802.16 (WiMAX), LTE, GSM, GPRS, CDMA, EV-DO, and/or HSPDA, among others. Furthermore, the device 102 may be configured to connect to access point 118 using multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Alternatively, the host 106 may also include connectivity to the internet 120, and thus, the device 102 may access the internet 120 through the host 106.

One or more of the described functions of the system 100 may be divided up into additional functional or physical components, or combined into fewer functional or physical components. For example, although the sensor 114 is illustrated as a component of the device 102, the sensor 114 may be separate from the device 102, and thus, may communicate with the device 102. In some further examples, additional functional and/or physical components may be added to the examples illustrated by FIG. 1.

Figure 2:
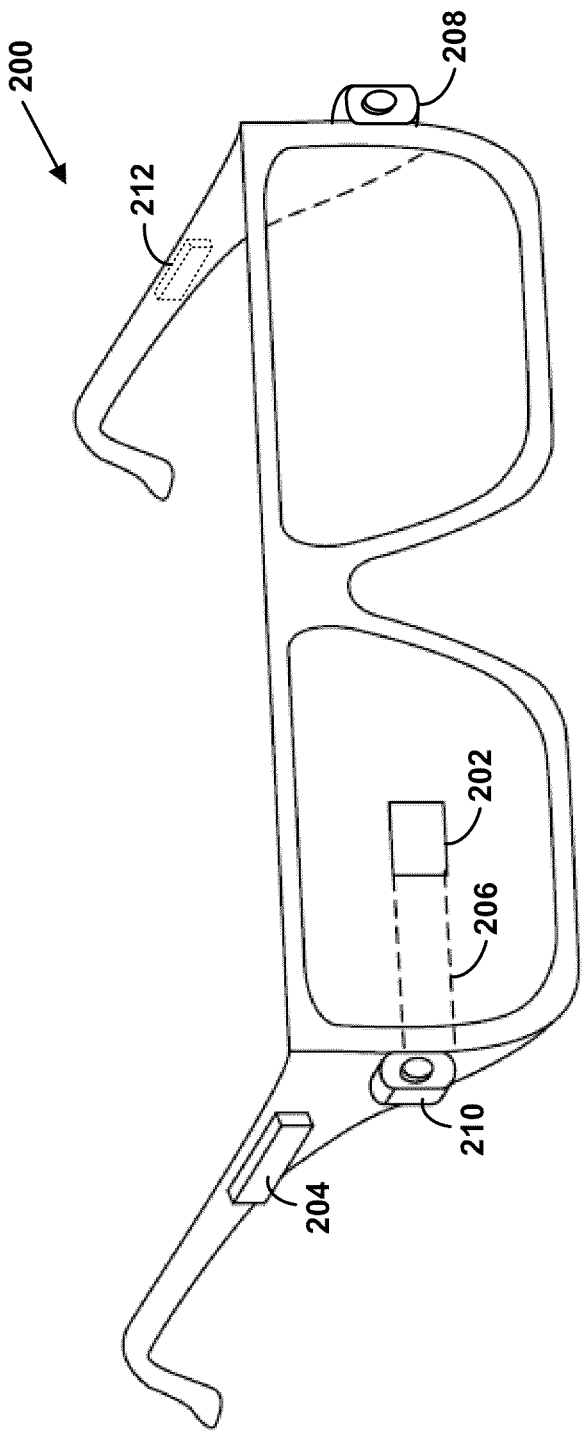
FIG. 2 illustrates an example system for receiving, transmitting, and displaying data.

FIG. 2 illustrates an example system 200 for receiving, transmitting, and displaying data. The system 200 is shown in the form of a wearable computing device, such as an HMD that includes a pair of eyeglasses. In one example, the system 200 may be configured to operate as the device 104 shown in FIG. 1 or to include any of the functions of the device 104 shown in FIG. 1.

The system 200 includes a display 202, an on-board computing system 204, an optical waveguide 206, a video camera 208, a laser projector 210, and a sensor 212. One or more of the described components or functions of the system 200 may be divided up into additional functional or physical components, or combined into fewer functional or physical components. In some further examples, additional functional and/or physical components may be added to the example system 200 illustrated by FIG. 2.

The display 202 may be configured to overlay computer-generated graphics in the user's view of the physical world. The display 202 is shown to be provided in a center of a lens of the pair of eyeglasses, however, the display 202 may be provided in other positions. In addition, more than one display may be provided, such as, for example, to provide a second display on the opposite lens of the eyeglasses, or multiple displays in one lens.

The display 202 is controllable via the on-board computing system 204 that is coupled to the display 202 via the optical waveguide 206. The on-board computing system 204 is shown to be positioned on an arm of the pair of eyeglasses, however, the on-board computing system 204 may be provided in other positions as well (e.g., such as at a nose of the eyeglasses). The on-board computing system 204 may include a processor and memory, for example. The on-board computing system 204 may be configured to receive and analyze data from the video camera 208 (and possibly data from other sensory devices and/or user interfaces), and to control the display 202 accordingly. Furthermore, data making up graphics (e.g., video, images, text, etc.) may be relayed from on-board computing system 204 to the display 202 via the optical waveguide 206.

The video camera 208 is shown mounted on a frame of the eyeglasses. The video camera 208 may be mounted at other positions as well. The video camera 208 may be configured to capture images (e.g., video) at various resolutions and/or at different frame rates (e.g., varying frames per second (fps)). Many video cameras with a small form-factor, such as those used in cell phones, webcams, etc., are well known to those skilled in the art, and may be incorporated into an example of the system 200. However, it should be understood that examples described herein are not limited to any particular type of video camera. Although FIG. 2 illustrates one video camera 208, more video cameras may be used, and each may be configured to capture the same view, or to capture different perspectives or views and thus may be mounted on other areas of the pair of eyeglasses.

The video camera 208 may be oriented so as to generally track the user's frame of reference (i.e., the user's point of view) by orienting the video camera 208 to capture a view similar to the user's view. Other configurations are also possible. As shown in FIG. 2, the video camera 208 may be mounted on an arm of the eyeglasses and oriented to capture images in front of the eyeglasses. Alternatively, the video camera 208 may be mounted on a user's forehead or in between the user's eyes, and oriented in the same direction as the user's eyes. The video camera 208 may be configured to track movement of the user's head, and thus the perspective of recorded video at a given point in time may capture the user's frame of reference (i.e., the user's view) at that time.

In one example, the display 202 is positioned and sized such that images being displayed appear to be overlaid upon or to "float" in a user's view of the physical world, thus providing an experience in which computer-generated information can be merged with the user's perception of the physical world. To do so, on-board computing system 204 may be configured to analyze video footage that is captured by the video camera 208 to determine what graphics should be displayed, and how the graphics should be displayed (e.g., location on the display, size of the graphics, etc.).

The laser projector 210 is shown mounted to an arm of the eyeglasses opposite the video camera 208. However, the laser projector 210 may be mounted on the same arm as the video camera 208 or on other areas of the pair of eyeglasses. The laser projector 210 may be oriented so as to project images in a direction in which the user is looking. The laser projector 210 may be configured to project images, such as a virtual input device, onto a surface. In one example, the virtual input device may include a laser pattern of objects that take the form of a QWERTY keyboard. The laser pattern of objects may include many other types or configurations as well depending on an application of the system 200.

The laser projector 210 may provide a visual image, or alternatively, the laser projector 210 may include an infrared (IR) projector to provide IR or a combination of a laser pattern and IR. In one example, when an IR projector is used, images may be seen in a heads-up display (described below) in FIG. 3B.

The laser projector 210 may provide a pattern generated by a laser passing through a diffraction pattern generator to create a grid of dots or lines, for example, resulting in a laser pattern.

In addition, the laser projector 210 may be configured to provide a projection in any desired direction. For example, the laser projector 210 may include mirrors that can be configured to reflect the projection in a desired direction, or the laser projector 210 may include a movable base to change a direction of projection (e.g., a motorized or non-motorized base).

Still further, the laser projector 210 may be or include generally any type of projector display (e.g., laser projector, LCD backlight, liquid crystal on silicon (LCOS), etc.), and a projector including a laser is one example. Other examples are possible as well.

The sensor 212 is shown mounted on an arm of the pair of eyeglasses, however, the sensor 212 may be positioned on other areas of the system 200. The sensor 212 may include one or more of a gyroscope or an accelerometer, for example. Other sensing devices may be included within the sensor 212 or other sensing functions may be performed by the sensor 212. In addition, additional sensors may be included on the system 200, or additional input devices, such as a trackpad input device, buttons for input, etc.

Figure 3A:
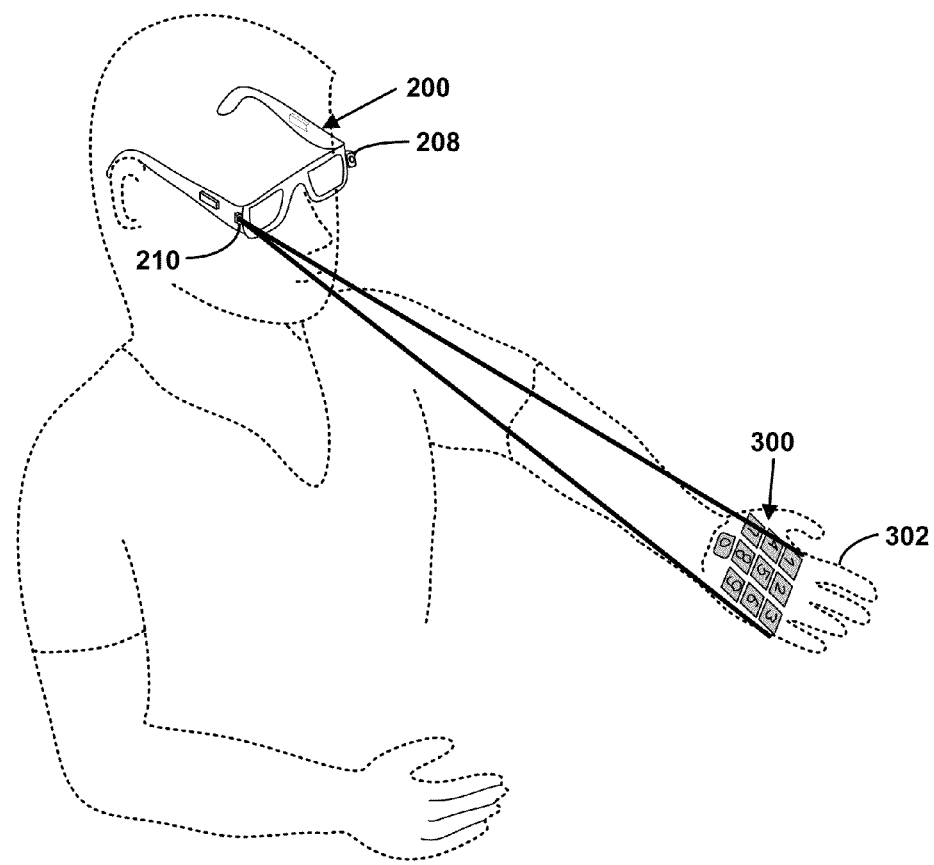
FIGS. 3A-3B illustrates an example operation of the system of FIG. 2.

FIG. 3A illustrates an example operation of the system 200 of FIG. 2. In one example, a user may wear the system 200 as a pair of eyeglasses, and the laser projector 210 may be configured to provide a projection of a laser pattern of objects 300. The user may direct where the projection of the laser pattern of objects 300 is displayed based on a gaze direction of the user (e.g., a direction that the user is looking). In the example shown in FIG. 3A, the user is looking at a hand 302, and thus, the laser pattern of objects 300 may be projected onto the hand 302. In this example, the hand 302 may be considered a display hand, and the laser projection of objects 300 is a number keypad. However, the laser pattern of objects 300 may be projected onto any surface, and may include any number of objects and content of the objects can be configured as desired.

Figure 3B:
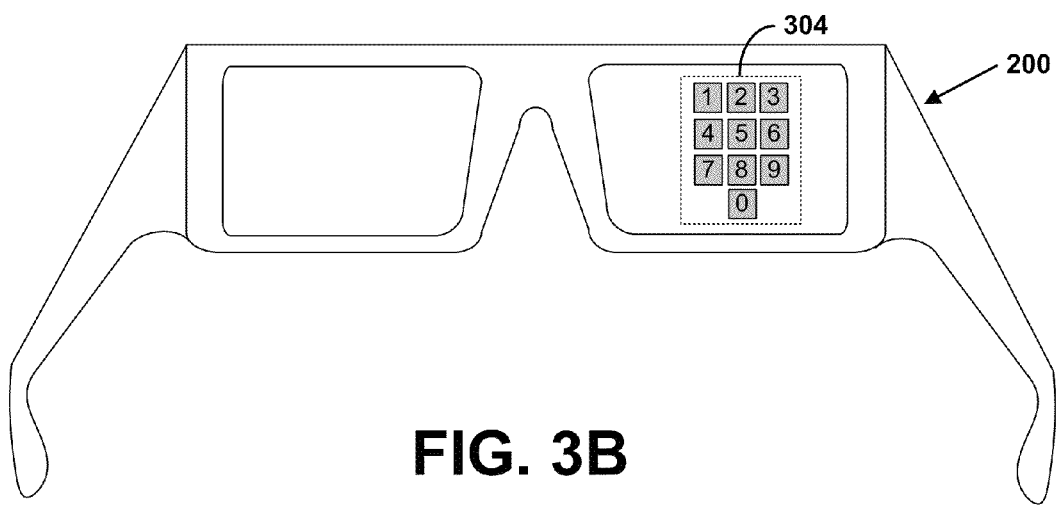

FIG. 3B illustrates another example operation of the system of FIG. 2. In this example, the projection may be viewed in a heads-up-display 304 of the glasses. The heads-up-display 304 may be configured to align graphics to overlay onto the hand 302 as the user views the graphics. In this example, there may be no projection of a virtual input device onto a surface.

Although the system 200 is shown embodied with a pair of glasses in FIGS. 3A-3B, components of the system may be separate from the glasses. For example, the camera 208 and/or the projector 210 may be separate from the glasses and could be attached to a user at other areas including a neck, chest, wrist or belt, and configured to project images and capture images from a surface. As a specific example, the camera and projector could be attached to a belt of a user and directed to project the laser pattern onto the floor or feet of the user, rather than or in addition to, projecting onto the user's hand. Further, components of the system 200, including the camera 208 and the projector 210, may be removable from the glasses and can be positioned on a user's belt, for example, or customized to be configured to operate in any direction as desired. Still further, the system may include multiple cameras and/or multiple projectors to project patterns and capture images of multiple areas.

Figure 4:
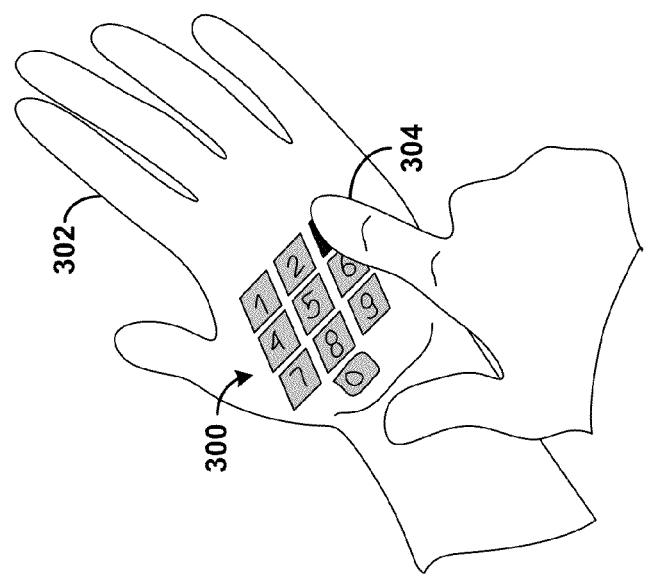
FIG. 4 illustrates an example of receiving an input on a virtual input device.

In one example, when the laser pattern of objects 300 is projected onto the display hand 302, the camera 208 may photograph images of the hand 302 and the laser pattern of objects 300. In one example, where the laser pattern of objects 300 includes a virtual input device, a user may use an opposite hand to provide an input to the virtual input device. FIG. 4 illustrates an example of receiving an input on a virtual input device. For example, in FIG. 4, the laser pattern of objects 300 projected onto the hand 302 (e.g., onto a palm of the hand 302), and a user may use an opposite hand to provide an input by selecting one of the objects of the laser pattern of objects 300.

When the user moves a finger 304 (e.g., an action finger) through the laser pattern of objects 300, the camera 208 may photograph a discontinuity of laser line curved around the action finger 304. A change in the laser line can be used to determine a location or an approximate location of the action finger 304. For known laser patterns, e.g., a set of 10 icons displayed as buttons, a processor of the on-board computer of the system 200 can detect which button in the laser pattern of images 300 is distorted by the action finger 304 to determine which button is being selected. After determining which of the objects has been selected, the on-board computer of the system 200 may direct the laser projector to alter the selected object, such as by changing a color of the object, for example.

Although FIG. 4 illustrates the laser pattern of objects 300 projected onto the hand 302, the laser pattern of objects 300 may be projected onto any area or surface (e.g., other than a hand), and the user may use any item capable of distorting the laser pattern to make selections on the virtual input device.

Figure 5:
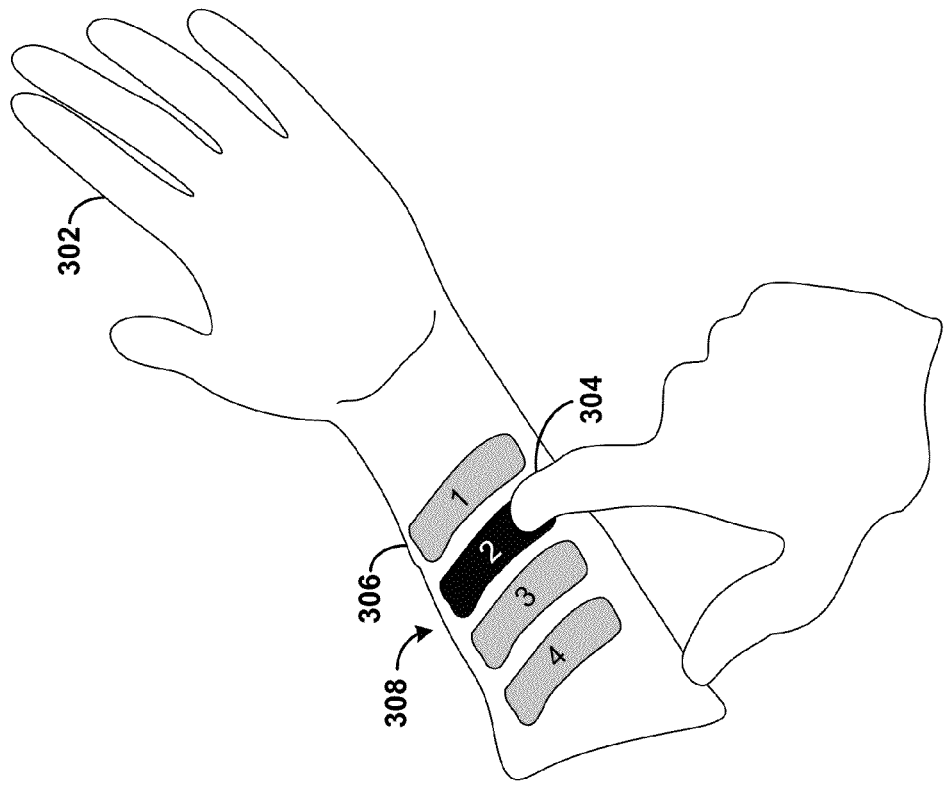
FIG. 5 illustrates another example of receiving an input on a virtual input device.

FIG. 5 illustrates another example of receiving an input on a virtual input device. In FIG. 5, a laser pattern of objects 308 is projected onto a forearm 306 of a user, and a user may use an opposite hand to provide an input by selecting one of the objects of the laser pattern of objects 308. In this example, the laser pattern of objects 308 includes four buttons numbered one to four, and the second button changes color after selection by the user.

Figure 6:
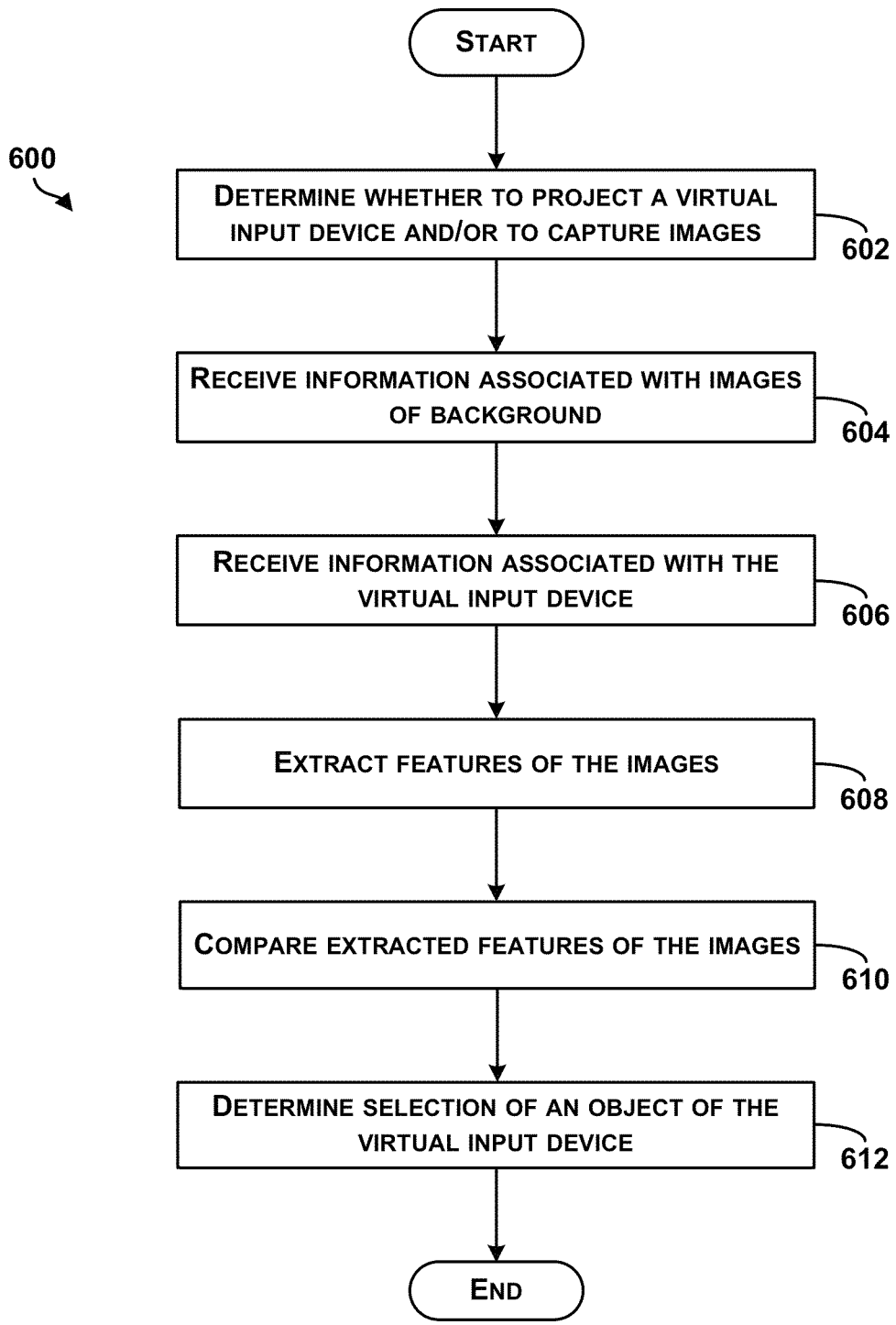
FIG. 6 is a block diagram of an example method to determine selection of an object of a virtual input device, in accordance with at least some embodiments described herein.

FIG. 6 is a block diagram of an example method to determine selection of an object of a virtual input device, in accordance with at least some embodiments described herein. Method 600 shown in FIG. 6 presents an embodiment of a method that, for example, could be used with the systems 100 and 200, for example, and may be performed by a device, such as a head mounted device, or components of the device. Method 600 may include one or more operations, functions, or actions as illustrated by one or more of blocks 602-612. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 600 and other processes and methods disclosed herein, each block in FIG. 6 may represent circuitry that is wired to perform the specific logical functions in the process.

At block 602, method 600 includes determine whether to project a virtual input device and/or to capture images. The method 600 may be performed by the system 200 in FIG. 2, for example, where a laser projector and a camera are mounted on eyeglasses. The eyeglasses may further include a gyroscope to sense head movement. The laser projector may begin projecting a virtual input device (e.g., a laser pattern of objects) and the camera may be configured to begin capturing images of the virtual input device when a user's head is stable or substantially stable (e.g., stationary or substantially stationary). Whether a user's head is stable may be determined based on outputs the gyroscope, such as for example, when outputs are within an acceptable range or below a predetermined threshold. Once a user's head is determined to be stable, the camera may begin capturing images (or video) to capture user inputs on the virtual input device. In this manner, the user may indicate to the system that the user is ready for interaction with the virtual input device to begin by maintaining their head stationary or substantially stationary.

As one example, if images from the camera no longer include images of the laser pattern of objects (or no longer include discernable images of the laser pattern of objects), the laser projector may discontinue projecting the virtual input device and the camera may discontinue capturing images. In this example, a surface onto which the laser pattern of objects may be moved out of the line of projection of the laser projector (e.g., the user moves a display hand out of the line of projection of the laser pattern), and a processor processing captured images may determine that the user is no longer using the virtual input device. From another point of view, the user may move his/her head so that the line of projection of the laser pattern no longer resides on a surface which can provide a background for the laser pattern so that discernable images (e.g., images having a brightness/resolution above a threshold level) of the laser pattern can be interpreted. For example, a user wearing the system 200 in FIG. 2 may look in a downward direction to project the laser pattern of objects onto the user's hand, and after use of the virtual input device, the user may then look upward or forward so that the laser pattern of objects is projected in a forward direction and not onto any surface in particular.

At block 604, the method 600 includes receive information associated with images of background. For example, a video camera may capture images of a virtual input device being projected onto a surface. The images may include the virtual input device, such as a laser pattern of objects. At block 604, a laser projector may perform a calibration prior to a user providing inputs to the virtual input device. For instance, to initiate the virtual input device, the laser projector may provide a blinking laser pattern (e.g., turn projected laser pattern on/off) to indicate that the pattern is now active. Upon sensing or identifying the blinking laser pattern (based on captured images), the camera may perform a calibration by capturing an image of the laser pattern with no user interaction, which can be used as a reference image (and may be stored in memory) to determine when the user interacts with the laser pattern. For example, images can be captured with the pattern and without the pattern, and a difference of the images can be determined to result in the pattern. Based on images of the pattern alone, brightness of the pattern can be adjusted by modifying power of the projector, for example.

As another example, to initiate the virtual input device, a chime or voice announcement may be made. Still further, to initiate the virtual input device, any type or form of a notification may be provided.

At block 606, method 600 includes receive information associated with the virtual input device. For example, the video camera may capture images of a user interacting with the virtual input device. The images may include an object, e.g., an action finger, interrupting a line of the laser pattern of objects. In this example, a user may move a finger through a line of the laser pattern so as to indicate a selection of one of the objects of the laser pattern. The video camera may capture images of the finger as the finger moves to indicate a selection of one of the objects of the laser pattern. A processor may then receive the information associated with the virtual image device. The information may be the images (e.g., video) captured by the video camera.

At block 608, the method 600 includes extract features of the images. For example, the processor may extract features of various levels of complexity from image data. Examples of features to extract include lines, edges, ridges, localized interest points such as corners or points, or complex features related to texture, shape, or motion, for example.

In one example, the images may represent a real world scene viewed by the camera that includes a static background as well as various foreground objects that are able to move, and the processor may extract features indicating the foreground objects. For instance, the background objects may include the laser pattern of projected objects, and the foreground objects may include a user's finger positioned over one of the object of the laser pattern.

At block 610, the method 600 includes compare extracted features of the images. In one example, the processor may compare extracted features of images to identify differences between images. In this manner, the processor may identify movement of a finger over an object of the laser pattern so as to identify which object is selected.

In another example, the processor may access the reference background image model in memory that may be recorded and stored during a calibration of the system. The background image model may represent an estimate of the laser pattern of objects, e.g., corresponds to what a camera image would look like if there were no foreground objects in the image. A foreground object may be presumed to differ in brightness from the background image. Thus, to identify foreground objects at each time step, a difference image can be created. The difference image may be a result of subtracting a camera image from the background model image. For each pixel in the difference image, if an absolute value of the difference is larger than a particular threshold, then that pixel may be classified as foreground; otherwise, that pixel may be classified as background. This difference threshold may vary depending on the background's brightness. As another example, if an absolute value of the difference is larger than a particular threshold for a particular length of time, then that pixel may be classified as foreground; otherwise, that pixel may be classified as background.

Thus, the processor may process features or images on a pixel-by-pixel basis to determine what portions of the features or images are foreground (e.g., representing an object selecting an object of the laser pattern of objects) and what portions of features or images are background. The processor may distinguish changes in the features and image.

At block 612, the method 600 includes determine selection of an object of the virtual input device. For example, the processor may determine which object of the laser pattern of objects is selected by the user by referring to the background image stored in memory and determining a location of the foreground object. The processor can referenced the stored background image and have knowledge of positions of the objects of the laser pattern of objects. For instance, if the laser pattern of objects is a representation of a number keypad, the processor may have knowledge of the positions/locations of each object representing a number key. The processor can then determine a location of a foreground object and compare that location to known locations of the objects in the laser pattern. Where a location matches (or substantially matches or overlaps), the processor may determine that the foreground object overlays the object in the laser pattern. The overlaid object in the laser pattern can be determined as the object selected.

In one example, the method 600 in FIG. 6 is an example of computer vision. Input images from a camera are received and a computer vision system may separate foreground objects of interest (e.g., a user's finger) from background images in real time so that a location and outline of the foreground objects can serve as indicators for inputs to the virtual input device.

In a further example, referring back to FIG. 4, the laser projection of objects 300 is projected onto a surface, such as the display hand in FIG. 4, and components of a system (e.g., processor and camera) may be configured to determine when the display hand 302 is moving and to interpret display hand movements as inputs to the virtual input device.

FIGS. 7-10 illustrate example movements of a projection surface. For example, when the display hand 302 is tilted, a display of the laser projection of objects 302 is changed, and the change in the display of the laser projection of objects 302 can be identified. As the display hand 302 is tilted away from the user, an image in the laser pattern on a far edge of the hand will be smaller than an image in the laser pattern on a close edge of the hand. Similarly, if the display hand is rotated toward the user, an edge of the hand closest to the projector displays objects larger, and an edge farther away from the projector displays objects smaller. Movement of the display hand (e.g., tilt and rotation) can be determined and accepted as a user selection. In one example, movement of the display hand can be interpreted similar to user inputs received from a mouse on a standard computer. Rotation can be interpreted as a horizontal (x-axis) movement, and tilt can be interpreted as a vertical (y-axis) movement.

In FIGS. 7A-7C, example rotation movements of a projection surface are illustrated. In FIG. 7A, the display hand 302 is shown with the laser projection of objects 300 provided by an example system. An x-y axis is also shown for reference regarding direction and orientation of movements of the display hand 302, and may be the reference axis from the perspective of the system. In FIG. 7A, the display hand 302 is shown stationary, and a center object (e.g., box 5) is shown highlighted. In one example, components of the system may be configured to highlight a center object based on a location of the objects. As shown in FIG. 7A, the center box 5 is at location (0,0) on the x-y axis, and thus, is in a center location from the perspective of the system.

In FIGS. 7B-7C, the display hand 302 is rotated about the y-axis such that an edge 310 of the display hand 302 faces the user and a thumb of the display hand 302 is rotated away from the user. In this manner, with the laser projection of objects 300 remaining stationary (or substantially stationary) due to lack of movement of the projector, a right column of the laser projection of objects 300 (e.g., numbers 3, 6, and 9) is projected onto the edge 310 of the display hand 302 and will appear larger in size than any of the remaining objects due to a change in the projection surface. Upon determining that the display hand 302 has been rotated in this manner (e.g., using any of the methods described above in FIG. 6), components of the system may be configured to highlighted the box that is now at the center location (e.g., box 6). FIG. 7C illustrates the center box highlighted.

In FIGS. 8A-8C, additional examples of rotation movements of a projection surface are illustrated. In FIG. 8A, the display hand 302 is shown with the laser projection of objects 300 provided by an example system. In FIGS. 8B-8C, the display hand 302 is rotated about the y-axis such that an inner edge 312 of the display hand 302 faces the user and the edge 310 of the display hand 302 is rotated away from the user. In this manner, with the laser projection of objects 300 remaining stationary (or substantially stationary) due to lack of movement of the projector, a left column of the laser projection of objects 300 (e.g., numbers 1, 4, and 7) is projected onto the inner edge 312 of the display hand 302 and will appear larger in size than any of the remaining objects due to a change in the projection surface. Upon determining that the display hand 302 has been rotated in this manner (e.g., using any of the methods described above in FIG. 6), components of the system may be configured to highlighted the box that is now at the center location (e.g., box 4). FIG. 8C illustrates the center box highlighted.

FIGS. 7-8 illustrate example rotation movements of the projection surface. Rotation movements may be interpreted as a horizontal movement of a selector, which is shown as a highlighted object, for example.

Figures 9A, 9B, 9C:
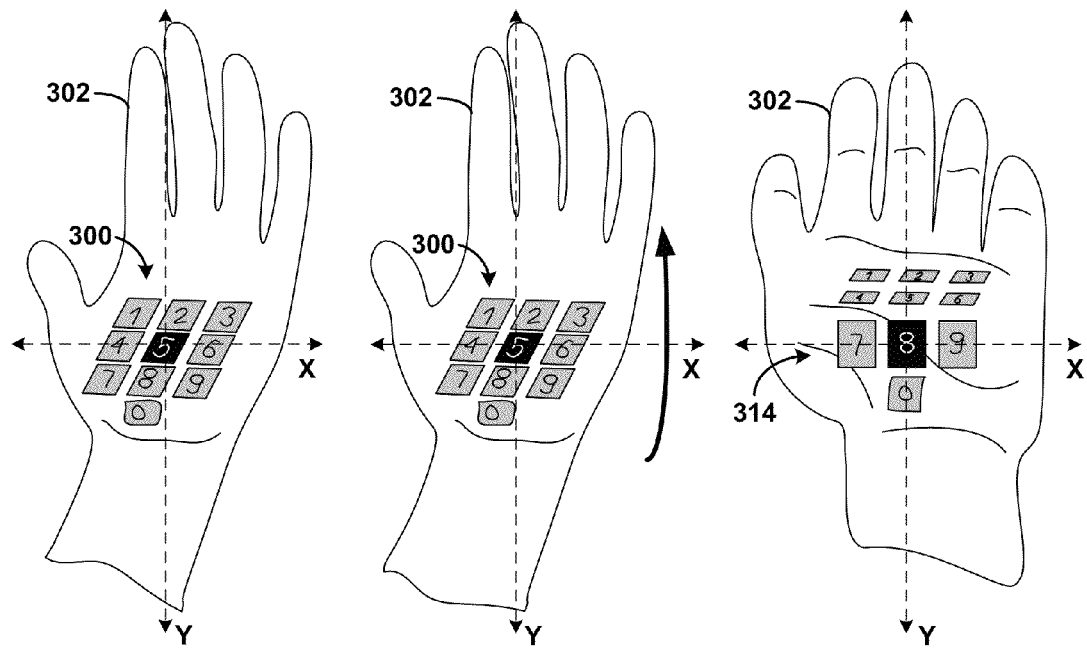
FIGS. 9A-9C illustrate example tilt movements of a projection surface.

In FIGS. 9A-9C, example tilt movements of a projection surface are illustrated. In FIGS. 9B-9C, the display hand 302 is tilted about the x-axis such that a heel 314 of the display hand 302 faces the user and fingers of the display hand 302 are tilted away from the user. In this manner, with the laser projection of objects 300 remaining stationary (or substantially stationary) due to lack of movement of the projector, a bottom row of the laser projection of objects 300 (e.g., numbers 3, 6, and 9) is projected onto the heel 314 of the display hand 302 and will appear larger in size than any of the remaining objects due to a change in the projection surface. Upon determining that the display hand 302 has been rotated in this manner (e.g., using any of the methods described above in FIG. 6), components of the system may be configured to highlighted the box that is now at the center location (e.g., box 8). FIG. 9C illustrates the center box highlighted.

Figures 10A, 10B, 10C:
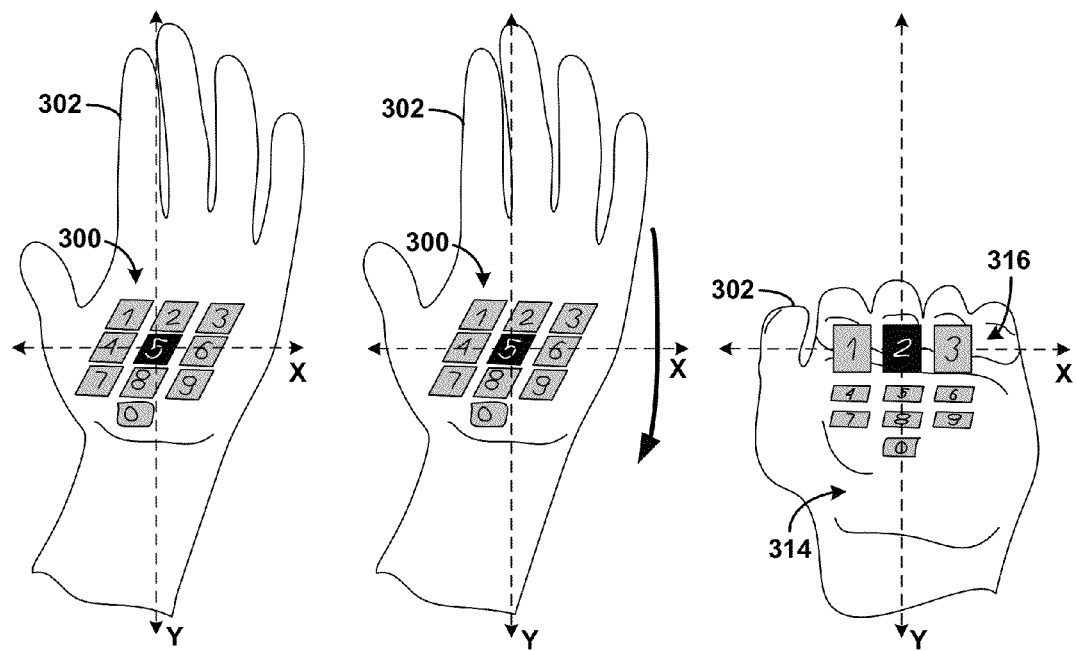
FIGS. 10A-10C illustrate additional example tilt movements of a projection surface.

In FIGS. 10A-10C, additional example tilt movements of a projection surface are illustrated. In FIGS. 10B-10C, the display hand 302 is tilted about the x-axis such that fingertips 316 of the display hand 302 face the user and the heel 314 of the display hand 302 are tilted away from the user. In this manner, with the laser projection of objects 300 remaining stationary (or substantially stationary) due to lack of movement of the projector, a top row of the laser projection of objects 300 (e.g., numbers 3, 6, and 9) is projected onto the fingertips 316 of the display hand 302 and will appear larger in size than any of the remaining objects due to a change in the projection surface. Upon determining that the display hand 302 has been rotated in this manner (e.g., using any of the methods described above in FIG. 6), components of the system may be configured to highlighted the box that is now at the center location (e.g., box 2). FIG. 10C illustrates the center box highlighted.

FIGS. 9-10 illustrate example rotation movements of the projection surface. Rotation movements may be interpreted as a vertical movement of a selector, which is shown as a highlighted object, for example.

The example rotation and tilt movements shown in FIGS. 7-10 may be used in combination. For example, after performing a rotation movement as shown in FIGS. 7A-7C, a user may perform a tilt movement as shown in FIGS. 9A-9C so as to move the projection surface such that a lower right corner object (e.g., box 9) is at the center location. In this example, the rotation movement may be performed and while rotated, the tilt movement may be performed. Any other example combinations of rotation and tilt movements may be performed so as to cause any of the objects of the laser projection of objects 300 to be at the center location.

As one example, a laser may project a 3×3 grid of 9 buttons on a surface, as shown in FIGS. 7-10. Initially, a center button may be highlighted or indicated otherwise by a selector (e.g., by use of a pointer or other graphical icon). By rotating the surface, a processor of the system may be configured to determine that a button larger than the highlighted button exists, and may instruct the laser projector to highlight the larger button. Similarly, by tilting the display hand away from the user, the processor may identify another button larger, and may instruct the laser projector to highlight the larger button. The rotation and tilt movements may be interpreted similar to movements of a mouse on a computer, for example.

Figure 11A:
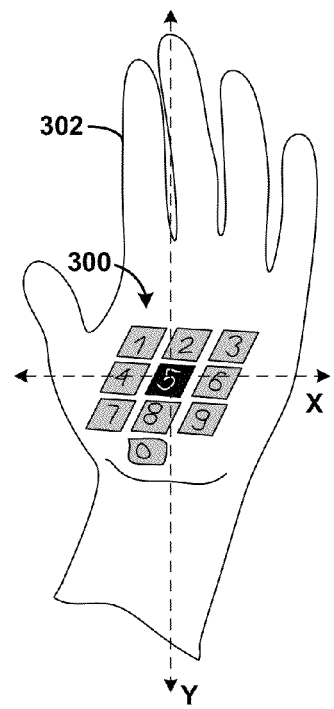
FIGS. 11A-11C illustrate example movements of a projection surface to indicate a selection of an object.
Figure 11B:
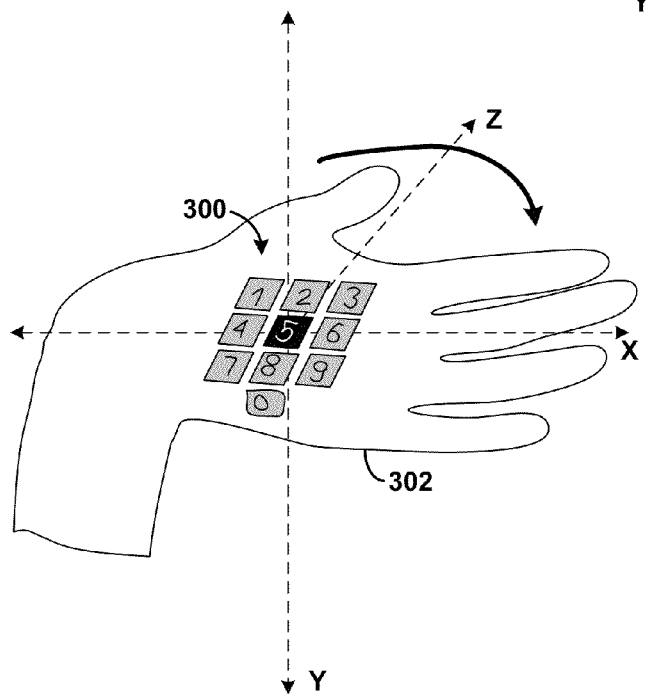
Figure 11C:
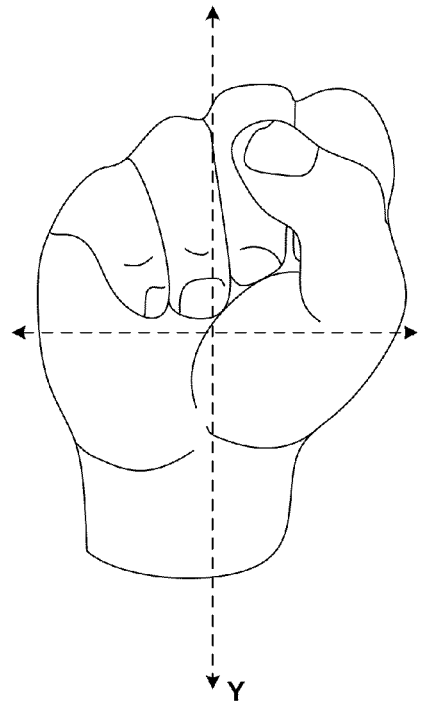

In one example, the user may select a highlighted object by making another movement of the projection surface. FIGS. 11A-11C illustrate example movements of a projection surface to indicate a selection of an object. In FIG. 11A, the display hand 302 is shown with the laser projection of objects 300 in which a center object (e.g., box 5) is highlighted. In FIG. 11B, a user may rotate the display hand 302 about the z-axis so as to indicate selection of the highlighted object. Upon determining that the display hand 302 has been rotated in this manner (e.g., using any of the methods described above in FIG. 6), components of the system may be configured to receive the movement as a selection of the highlighted object. Rotation of the display hand 302 about the z-axis may be interpreted as a mouse click. As another example, as shown in FIG. 11C, a user may perform another hand movement, such as by closing the display hand 302 to make a fist. The fist gesture may be interpreted as a mouse click. Any type of hand gesture may be interpreted as a mouse click, such as making a predetermined gesture, holding up a certain number of fingers, providing a thumbs-up, turning the hand upside down, shaking hand back-and-forth, a pinch or any hand gesture as customized by a user, for example.

Using the example movements shown in FIGS. 7-11, the user may provide an input to the virtual input device using only the display hand 302. In other examples, the user may use the display hand and an action finger (independently or simultaneously) to provide an input.

FIG. 12 is a block diagram of an example method for operation of a virtual input device, in accordance with at least some embodiments described herein. Method 1200 shown in FIG. 12 presents an embodiment of a method that, for example, could be used with the systems 100 and 200, for example, and may be performed by a device, such as a head mounted device, or components of the device. Method 1200 may also be used with method 600, for example. Method 1200 may include one or more operations, functions, or actions as illustrated by one or more of blocks 1202-1208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 1202, method 1200 includes providing a virtual input device onto a surface. As one example, the virtual input device includes a laser pattern of objects, such as any of the laser projection of objects shown and described in FIGS. 7-11. Any number, type, size, and configuration of objects may be projected onto the surface. In addition, the surface may be any kind of surface on which laser projections may be displayed.

At block 1204, the method 1200 includes receiving images of the virtual input device. As one example, a camera may be configured to capture images of the virtual input device as projected onto the surface, and may be configured to provide the images to a processor.

At block 1206, the method 1200 includes, based on the images, determining movement of the surface. For example, movement of the surface may be determined using any method including the method 600 described in FIG. 6. Images may be compared to one another to identify movement of the surface.

At block 1208, the method 1200 includes determining a selection of an object of the virtual input device based at least in part on movement of the surface. For example, as shown and described in FIGS. 7-11, movement of the surface causes changes in display of objects of the virtual input device, and based on the changes, the selection of the object can be determined. Example changes in the objects include a display of a larger object in comparison to other objects due to movement of the surface.

FIG. 13 is a block diagram of another example method for operation of a virtual input device, in accordance with at least some embodiments described herein. Method 1300 shown in FIG. 13 presents an embodiment of a method that, for example, could be used with the systems 100 and 200, for example, and may be performed by a device, such as a head mounted device, or components of the device. Method 1300 may also be used with methods 600 or 1200, for example. Method 1300 may include one or more operations, functions, or actions as illustrated by one or more of blocks 1302-1308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 1302, method 1300 includes providing a virtual input device. As one example, the virtual input device includes a laser pattern of objects, such as any of the laser projection of objects shown and described in FIGS. 7-11. Any number, type, size, and configuration of objects may be projected onto the surface. In addition, the virtual input device may be provided onto a surface and the surface may be any kind of surface on which laser projections may be displayed.

At block 1304, the method 1300 includes receiving images of the virtual input device. As one example, a camera may be configured to capture images of the virtual input device as projected onto the surface, and may be configured to provide the images to a processor.

At block 1306, the method 1300 includes based on the images, determining a distortion of an object. For example, images may be compared to one another identify a distortion of an object or any change in the laser pattern of objects. In one example, an object may be distorted due to movement of the surface that may be determined using any method including the method 600 described in FIG. 6. Based on movement of the surface, an object may now be viewed larger, smaller, deformed, bended, stretched, etc., as compared to a view of the object prior to movement of the surface.

At block 1308, the method 1300 includes determining a selection of an object of the virtual input device based at least in part on the distortion of the object. For example, as shown and described in FIGS. 7-11, movement of the surface causes changes in display of objects of the virtual input device, and based on the changes, the selection of the object can be determined. Example changes in the objects include a display of a larger object in comparison to other objects due to movement of the surface. A processor may be configured to interpret distortion of an object as a selection of that object, for example.

Figure 14:
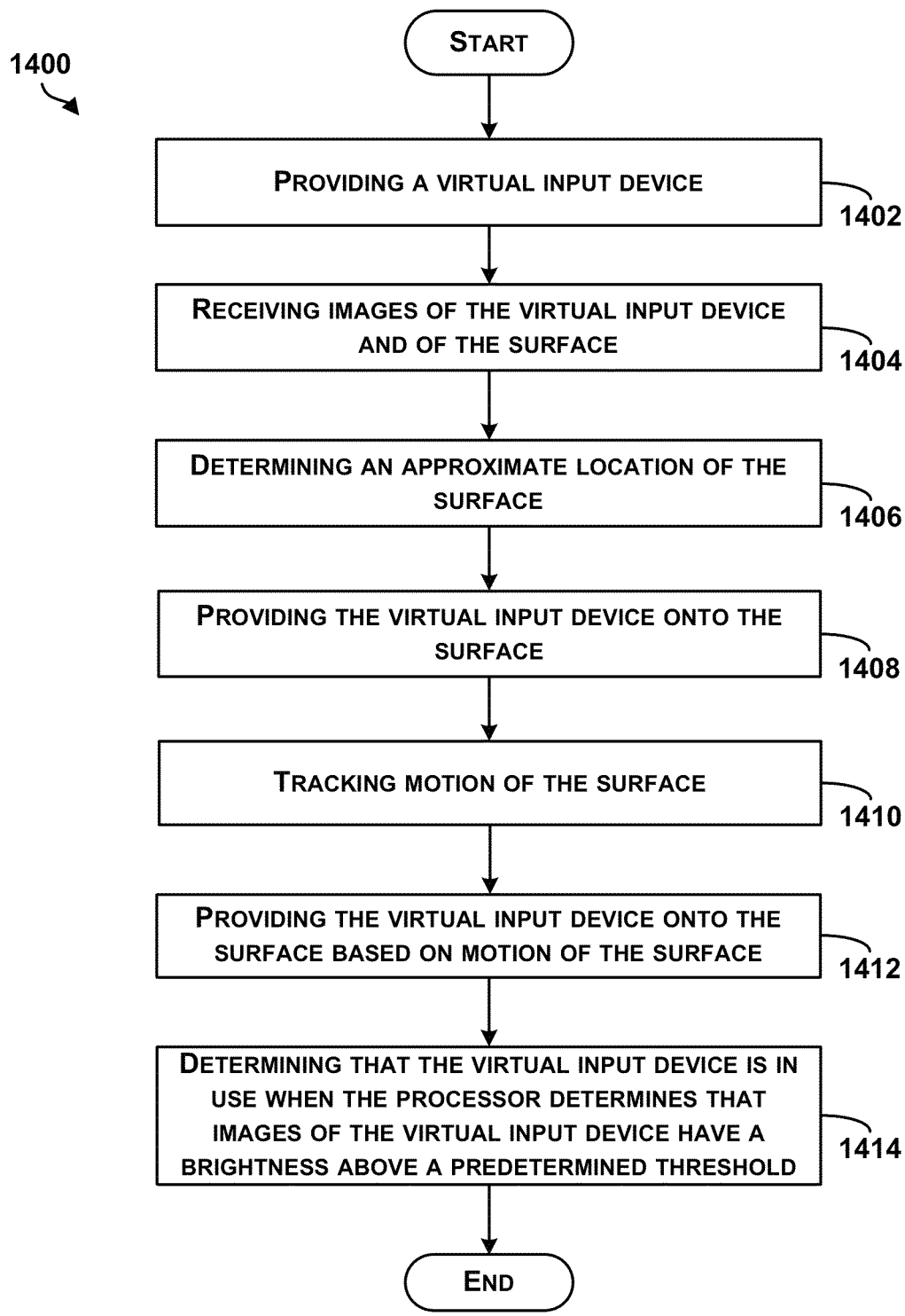
FIG. 14 is a block diagram of another example method for operation of a virtual input device, in accordance with at least some embodiments described herein.

FIG. 14 is a block diagram of another example method for operation of a virtual input device, in accordance with at least some embodiments described herein. Method 1400 shown in FIG. 14 presents an embodiment of a method that, for example, could be used with the systems 100 and 200, and may be performed by a device, such as a head mounted device, or components of the device. Method 1400 may also be used with methods 600, 1200, or 1300. Method 1400 may include one or more operations, functions, or actions as illustrated by one or more of blocks 1402-1414. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 1402, method 1400 includes providing a virtual input device. As one example, the virtual input device includes a laser pattern of objects, such as any of the laser projection of objects shown and described in FIGS. 7-11. Any number, type, size, and configuration of objects may be projected onto the surface. In addition, the virtual input device may be provided onto a surface and the surface may be any kind of surface on which laser projections may be displayed. Additionally, initially the virtual input device may be provided on an area, rather than specifically onto a surface, for example.

At block 1404, the method 1400 includes receiving images of the virtual input device and of the surface. As one example, a camera may be configured to capture images of the virtual input device as projected onto the surface, and may be configured to provide the images to a processor. In addition, the camera may be configured to capture images of the surface with or without the virtual input device projected thereon, and to provide the images to a processor.

At block 1406, the method 1400 includes determining an approximate location of the surface. For example, the processor may receive the images of the surface, and may determine an approximate location of the surface based on a comparison of the images. Particularly, the processor may use computer vision to track motion of the surface and determine a location. As another example, to track motion of the surface, when the surface moves through a projected image, light received at the camera from the projected image becomes brighter than light received at the camera from other areas. Thus, the processor may determine areas of bright sources of light that match a generated pattern within the projection to locate the projection. The projection may include a distinct pattern, and once the pattern is disturbed (e.g., by passing a surface through the pattern), the processor will determine a brightness of the image. By comparing images, the processor may determine a location of the surface. The projector may provide a broad and wide projection so as to initially locate the surface, or to initially locate an area including the surface, for example.

The location may be an approximate location rather than or in addition to an exact location of the surface. An approximate location may be a location of the surface within a threshold tolerance, such as within about 1 feet to 3 feet, about 1 cm to 3 cm, about 1 mm to 3 mm, about 1 µm to 3 µm, or other ranges as appropriate for a size of the surface and a distance of the surface from the system.

At block 1408, the method 1400 includes providing the virtual input device on the surface. For example, once the location of the surface is determined, the projector can modify the projection of the virtual input device to be onto the surface. Initially, the projection may be a wide pattern to cover a large area, and once a location of the surface onto which the projection is provided is determined, the projection can be narrowed down to provide more details or a higher resolution of images. For example, if the surface is a hand of a user, when the hand passes through the pattern, disturbances in pattern are determined and a location of the hand can be determined. As another example, the processor may be configured to determine an area of the surface, and to instruct the projector to provide the virtual input device onto the area of the surface, such as by widening or narrowing the projection to accommodate an available area. Thus, the projection may initially be of a first coverage area, and may subsequently be modified to that of a second coverage area that is less than or greater than the first coverage area (e.g., start off wide and decrease, or start off narrow and increase).

At block 1410, the method 1400 includes tracking motion of the surface. As an example, if the surface is a hand of a user, if the hand moves after the virtual input device is provided onto the hand, a portion of the virtual input device may not be discernable to the user or a camera (e.g., the camera may not receive enough light from those images). Thus, the processor may track motion of the surface, using methods described above to determine locations of the surface. As an example, images captured by the camera can be analyzed to determine motion of the surface.

At block 1412, the method 1400 includes providing the virtual input device onto the surface based on motion of the surface. For example, as the surface changes locations, the processor may instruct the projector to change a direction of the projection of the virtual input device so as to substantially provide the virtual input device onto the surface while the surface is in motion. Further, based on a speed of the motion, if a location of the surface is not readily found (e.g., the surface moves entirely out of view of the projection), the method 1400 can be performed to identify a new location of the surface. In this manner, computer vision may be used to realign projection of the virtual input device onto the surface as the surface moves.

At block 1414, the method 1400 includes determining that the virtual input device is in use when the processor determines that images of the virtual input device have a brightness above a predetermined threshold. For example, initially, when the projection is providing in an area (and not specifically onto a surface or onto a surface at a distance), light reflected to the camera and captured in images will have a certain brightness level. Once the projection is provided onto a surface that is closer to the camera, light reflected to the camera and captured in images will have a higher brightness level. Once the images have a brightness level above a predetermined threshold, the processor may determine that the virtual input device is in use. The images may have a brightness level above the predetermined threshold when the virtual image device is projected onto a surface that is at a distance lower than a predetermined threshold from the projector. Thus, when the projector provides the virtual input device onto a surface close to the user, the processor may determine that the virtual input device is in use. In one example, when the processor determines that the virtual input device is not in use (e.g., based on brightness levels received), the processor may shut-off the projector, camera, or other components of the system. Brightness levels below the threshold may be received if the virtual input device is not projected onto a surface that is at a distance lower than the distance threshold (e.g., the user's hand is not present at an area to operate as a display hand).

Examples of the predetermined thresholds described above may be specified in brightness levels with respect to other pixels in an image. For example, a threshold (e.g., used to determine that the brightness level is above a predetermined threshold), when exceeded, may indicate a presence of a surface upon which the virtual input device is projected (e.g., presence of a hand). When a hand passes through a projected pattern (e.g., generated by a laser pattern generator), pixels corresponding to laser spots may saturate (e.g., pixel values of 255, 255, 255 for red/green/blue even though laser spots tend to be red; whereas a remainder of pixels in an image may average about 128, 128, 128). Thus, when pixel values of an area of the image are above an average value of pixel values, or an average value of pixel values of the image, the first threshold may be satisfied.

When the hand is not intercepting a laser pattern, and the pattern is instead projected on the floor for example, the red/green/blue values of the laser spots tend toward average red/green/blue values of the pixels in a camera image. In the instance in which the surface is a hand, skin reflects a laser pattern relatively well (in some sense, skin resembles a Lambertian surface, where incoming light is reflected evenly in all directions). However, other surfaces, such as floors, tend to be darker (e.g., office carpet) or specular and offer other angles to reflect the light (e.g., polished tile floors). In addition, surfaces other than a user's hand may be more distant from the camera, and thus, light in the pattern may not reflect as well. Thus, when the hand is not intercepting the laser pattern, pixels corresponding to spots in a projected pattern for these more distant surfaces may tend more toward the average red/green/blue value in the image.

Alternatively, there are other manners in which the processor may determine that the virtual input device is in use. For example, a projected pattern can be aimed so that the projected pattern is viewable by the camera when the pattern is projected on near surfaces but not when the projected pattern is projected on surfaces farther away. Specifically, referring to FIG. 3A for reference, the projector 210 may be mounted on a right side arm of eyeglasses, and may be positioned so that it is configured to project toward (e.g., provide a projection) or onto a user's left hand. The camera 208 may be mounted on the left side arm of the eyeglasses and may be positioned so that it is configured to be aimed toward the user's right hand.

Since a field of view of the camera 208 may be limited (e.g., 60 degrees) and the projected pattern may have a limited visual arc (e.g., 10 degrees), the camera 208 may not see the pattern unless there is a surface for the projected image relatively near the camera 208 (i.e., the user's left hand in FIG. 3A or a piece of paper held in the left hand). A surface too far away may result in an image too far to the right relative to images that may be seen by the camera 208.

Using the example shown in FIG. 3A, center rays of the camera 208 and the projector 210 may be aimed to cross each other in front of the user. Thus, an area of overlap of the rays may occur at about an arm's length of the user. Using this method, either hand (or object) may be used for an interface, and may be positioned proximately centered in front of the user's body. Any object not in this area of overlap may not be seen by the camera 208 or may not have a pattern projected onto the object. A configuration of the camera 208 and the projector 210 as in this example helps avoid falsely interpreting objects or system functions.

In other examples, the projector 210 may be mounted on a left side arm of eyeglasses, and may be positioned so that it is configured to project toward (e.g., provide a projection) or onto a user's right hand, and the camera 208 may be mounted on the right side arm of the eyeglasses and may be positioned so that it is configured to be aimed toward the user's left hand. Still further, each of the camera 208 and the projector 210 may be mounted on the same side arm of the eyeglasses and may be configured to have rays aimed to cross each other at an area in front of the user.

In still other examples, the projector 210 may be mounted on a left (or right) side arm of the eyeglasses and may be configured to project toward (e.g., provide a projection) or onto a user's right hand, and the camera 208 may be mounted on a right (or left) side arm of the eyeglasses opposite the projector 210 and may be configured to be aimed toward the user's right hand. In this example, the camera 208 may be configured to have rays aimed to cross the projection at an area in front of the user (e.g., depending on a location of the user's hand).

As still another example, a pattern may be projected that subtends a high visual angle (e.g., field of view) compared to a field of view of a camera. A hand or object near the projector may enable the projector to provide the projected pattern image onto the hand. An object too far away may cause the image to spread too much for the camera to capture an entirety of the image, for example.

In one example, when the processor determines that the virtual input device is not in use, the processor may instruct the projector and/or camera to change directions of projection and image capture so as to locate a surface. To do so, a field of the projection may be increased or a direction of the projection may be modified until images having a predetermined threshold of resolution/brightness of the projection on a surface are received. Areas where the projection is disturbed may be determined to be locations of surfaces, and any one surface may be selected as a projection surface onto which the laser pattern can be projected. The system may present identified surfaces to a user for selection of a surface for use.

Figure 15:
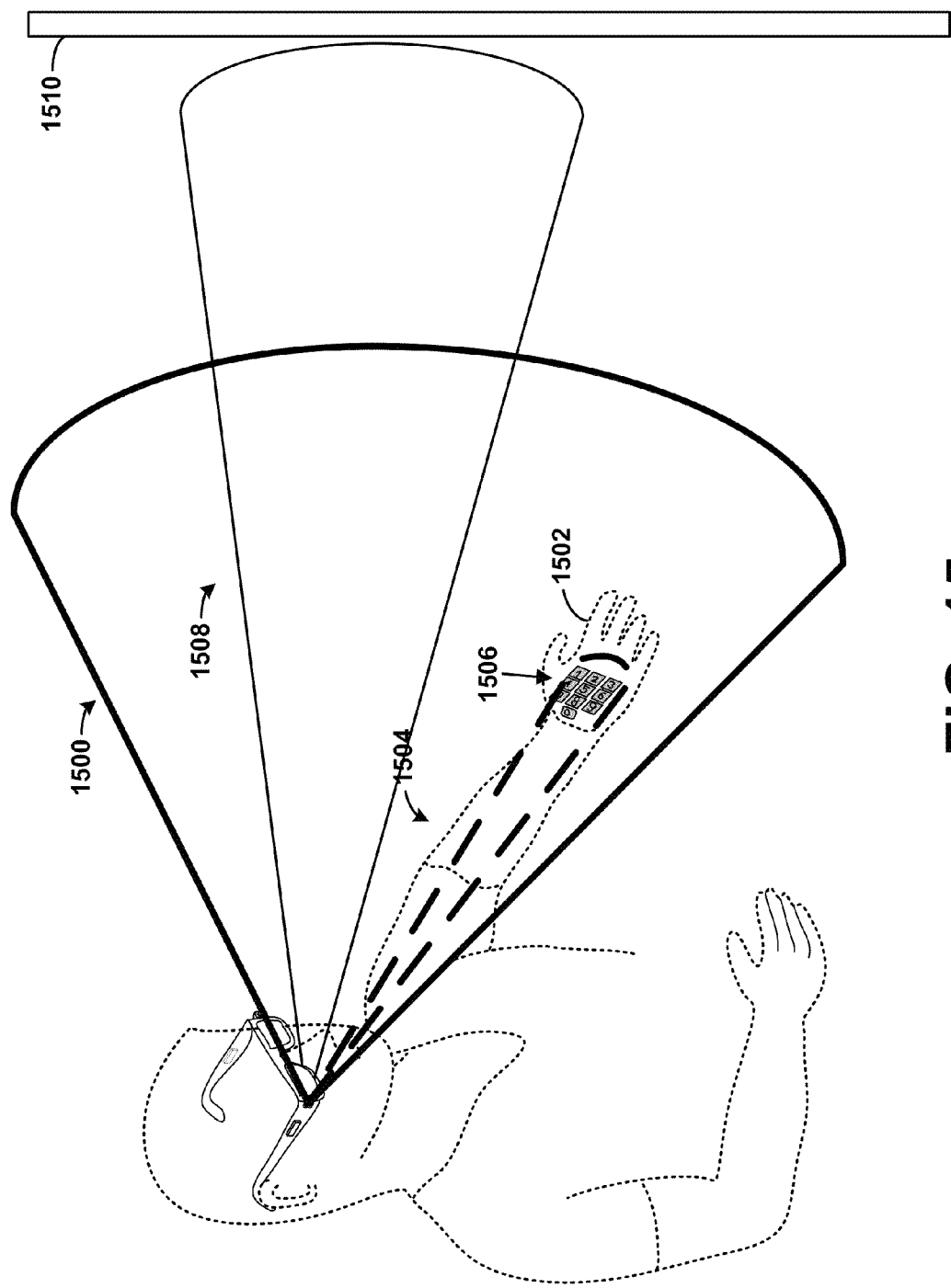
FIG. 15 illustrates an example operation of a system.

FIG. 15 illustrates an example operation of a system. In one instance, the system in FIG. 15 may be operated according to the method 1400 of FIG. 14. For example, initially, the system may provide a wide and broad projection 1500 so as to locate a surface onto which a virtual input device can be projected. In this example, images of a surface 1502 will have brightness levels higher than images of other areas within the projection 1500 due to a distance of the surface 1502 from the system (e.g., which is shown in the form of wearable glasses on a user). The system may identify or estimate a location of the surface 1502 and instruct the projector to provide a narrow or focused projection 1504 onto the surface 1502. The narrowed projection 1504 may provide more details or higher resolution graphics than the initial projection 1500. For example, the narrowed projection 1504 may provide a virtual input device 1506 in the form of a numeric keypad.

As another example, the system in FIG. 15 may provide a projection 1508 onto a surface 1510 at a distance from the user. The surface 1510 may be a wall or another surface at a larger distance from the user than the user's hand. In this manner, with a larger surface area, the projection 1508 can be provided onto a surface that is a larger distance from the user, and a same or similar level of resolution can be obtained. To make selections or movements of a cursor on a virtual input device provided by the projection 1508, the user may make head movements so as to cause the projection to be distorted on the surface 1510. The camera may capture images of the virtual input device in both the distorted and undistorted configurations, and can make comparisons so as to determine an appropriate selection or movement of a cursor. In an example where the virtual input device is a 3×3 set of buttons, a head movement to the right will distort the projection such that a leftmost row of the set of buttons is a brighter projection on the surface 1510 than the other two rows, and thus, the projector may be configured to move the cursor to the left. Similar head movements up/down and left/right can cause movement of the cursor in any direction, with a default position of the cursor being in any position (e.g., a center position). To make selections of an object in the virtual input device, the system may include sensors to detect other movements of the user, such as an eye blink (e.g., using a camera), a head nod (using an accelerometer), or a selection may be made using a hand to point to a selection (in which the selection can be captured with the camera).

Figure 16:
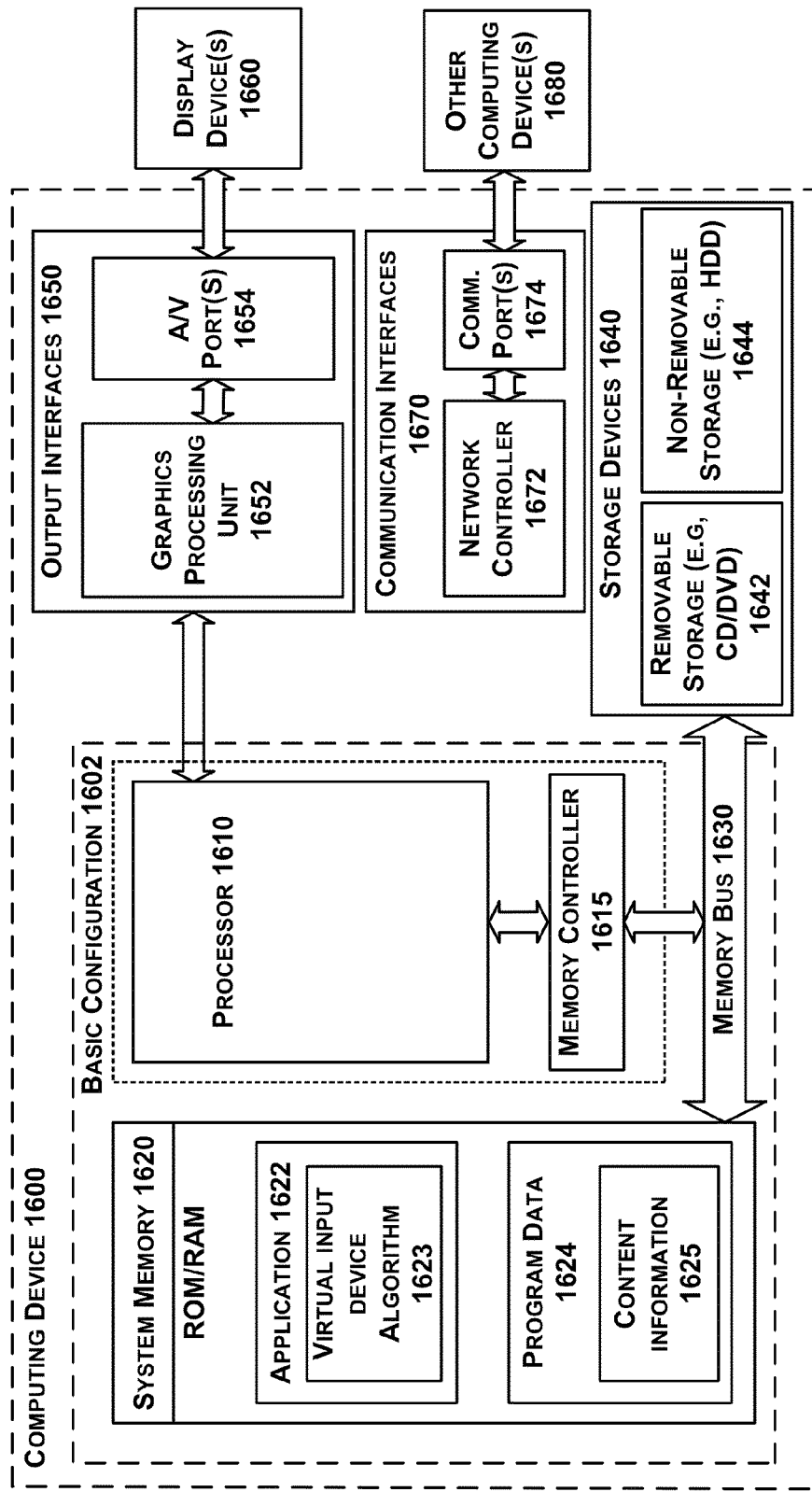
FIG. 16 is a functional block diagram illustrating an example computing device used in a computing system that is arranged in accordance with at least some embodiments described herein.

FIG. 16 is a functional block diagram illustrating an example computing device 1600 used in a computing system that is arranged in accordance with at least some embodiments described herein. The computing device may be a personal computer, mobile device, cellular phone, video game system, or global positioning system, for example, and may be implemented as a device, a transmitter, or a portion of a display device or transmitter as described in FIGS. 1-2. In a basic configuration 1602, computing device 1600 may include one or more processors 1610 and system memory 1620. A memory bus 1630 can be used for communicating between the processor 1610 and the system memory 1620. Depending on the desired configuration, processor 1610 can be of any type including but not limited to a microprocessor (µP), a microcontroller (µC), a digital signal processor (DSP), or any combination thereof. A memory controller 1615 can also be used with the processor 1610, or in some implementations, the memory controller 1615 can be an internal part of the processor 1610.

Depending on the desired configuration, the system memory 1620 can be of any type including but not limited to volatile memory (such as RAM), non-volatile memory (such as ROM, flash memory, etc.) or any combination thereof. System memory 1620 may include one or more applications 1622, and program data 1624. Application 1622 may include a virtual input device algorithm 1623 that is arranged to provide inputs to the electronic circuits, in accordance with the present disclosure, and may include instructions that can be executed by the processor 1610 to perform any methods described herein. Program Data 1624 may include content information 1625 that could be directed to any number of types of data, such as image data for example. In some example embodiments, application 1622 can be arranged to operate with program data 1624 on an operating system.

Computing device 1600 can have additional features or functionality, and additional interfaces to facilitate communications between the basic configuration 1602 and any devices and interfaces. For example, data storage devices 1640 can be provided including removable storage devices 1642, non-removable storage devices 1644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 1620 and storage devices 1640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1600. Any such computer storage media can be part of device 1600.

Computing device 1600 can also include output interfaces 1650 that may include a graphics processing unit 1652, which can be configured to communicate to various external devices such as display devices 1660 or speakers via one or more A/V ports or a communication interface 1670. The communication interface 1670 may include a network controller 1672, which can be arranged to facilitate communications with one or more other computing devices 1680 over a network communication via one or more communication ports 1674. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 1600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1600 can also be implemented as a personal computer including both laptop computer and non-laptop computer configurations.

Figure 17:
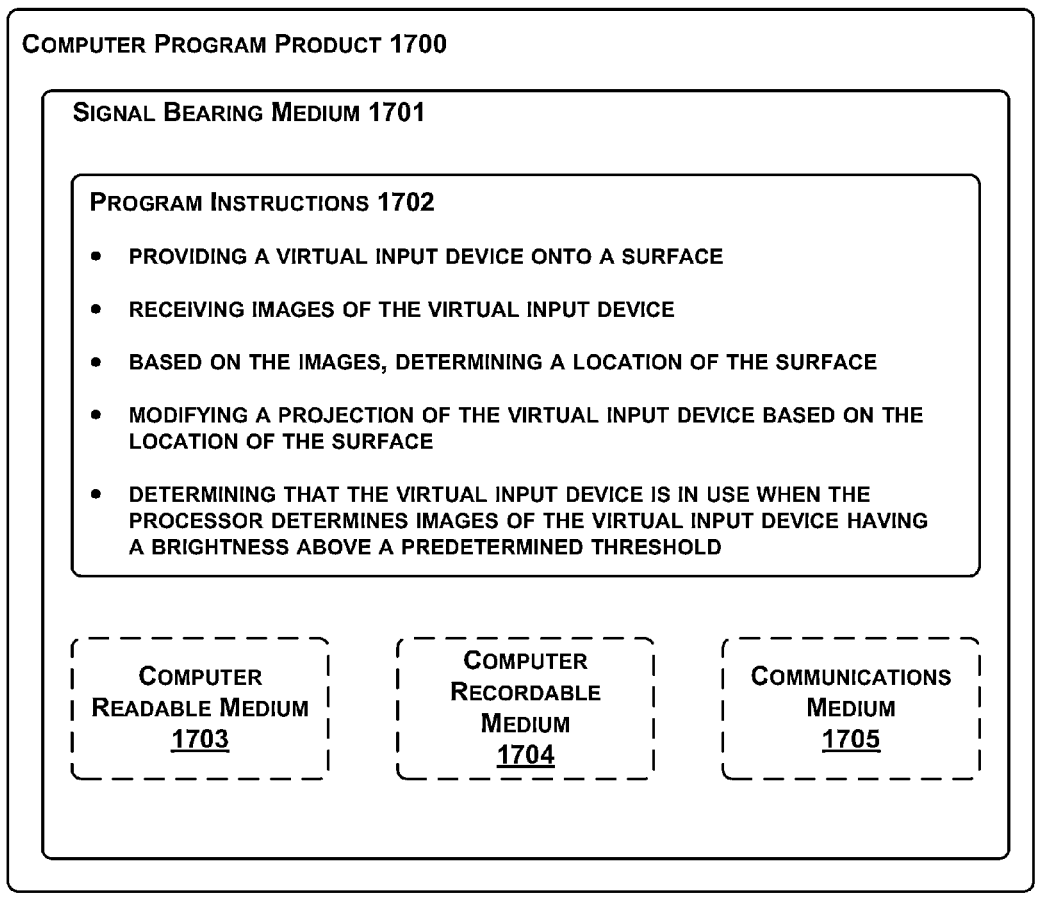
FIG. 17 is a schematic illustrating a conceptual partial view of an example computer program product that includes a computer program for executing a computer process on a computing device, all arranged in accordance with at least some embodiments described herein.

In some embodiments, the disclosed methods may be implemented in the form of computer-readable instructions encoded on a tangible computer-readable media within an article of manufacture or on other non-transitory media or articles of manufacture. The instructions may be in a machine-readable format, for example. FIG. 17 is a schematic illustrating a conceptual partial view of an example computer program product 1700 that includes a computer program for executing a computer process on a computing device, arranged according to at least some embodiments presented herein. In one embodiment, the example computer program product 1700 is provided using a signal bearing medium 1701. The signal bearing medium 1701 may include one or more programming instructions 1702 that, when executed by one or more processors may provide functionality or portions of the functionality described above with respect to FIGS. 1-16. Thus, for example, referring to the embodiments shown in FIGS. 6 and 12-14, one or more features of blocks 602-612, 1202-1208, 1302-1308, and/or blocks 1402-1414 may be undertaken by one or more instructions associated with the signal bearing medium 1701.

In some examples, the signal bearing medium 1701 may encompass a computer-readable medium 1703, such as, but not limited to, a hard disk drive, a Compact Disc (CD), a Digital Video Disk (DVD), a digital tape, memory, etc. In some implementations, the signal bearing medium 1701 may encompass a computer recordable medium 1704, such as, but not limited to, memory, read/write (R/W) CDs, R/W DVDs, etc. In some implementations, the signal bearing medium 1701 may encompass a communications medium 1705, such as, but not limited to, a digital and/or an analog communication medium (e.g., a fiber optic cable, a waveguide, a wired communications link, a wireless communication link, etc.). Thus, for example, the signal bearing medium 1701 may be conveyed by a wireless form of the communications medium 1705 (e.g., a wireless communications medium conforming with the IEEE 802.11 standard or other transmission protocol).

The one or more programming instructions 1702 may be, for example, computer executable and/or logic implemented instructions. In some examples, a computing device such as the computing device 1600 of FIG. 16 may be configured to provide various operations, functions, or actions in response to the programming instructions 1702 conveyed to the computing device 1600 by one or more of the computer readable medium 1703, the computer recordable medium 1704, and/or the communications medium 1705. Example programming instructions 1702 are illustrated in FIG. 17 to include portions of methods shown in FIGS. 6 and 12-14; however, the programming instructions 1702 may take other forms and may include instructions to perform any of the methods described herein (or portions of any of the methods described herein).

In still further examples, any type of devices or components of devices described herein may be used or configured as means for performing functions of any of the methods described herein (or any portions of the methods described herein).

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving information indicative of an amount of movement of a head-mountable computing device; and
determining that the indicated amount of movement is within a range of movement associated with the head-mountable computing device being substantially stationary and responsively:
providing, by a projector, an input device onto a surface, wherein the input device comprises a pattern of objects, and wherein the pattern of objects includes a plurality of regions;
receiving, from a camera, an image of the input device;
determining, by the head-mountable computing device, an approximate location of the surface based on a brightness level of the input device within the image of the input device;
modifying a power of the projector to adjust brightness of a projection of the input device based on the brightness level indicating that a distance between the surface and the camera exceeds a predetermined threshold distance;
highlighting a first region of the plurality of regions;
detecting that a size of a second region increased relative to the first region; and
highlighting the second region instead of the first region.

2. The method of claim 1, further comprising determining an area of the surface, wherein modifying the power of the projector to adjust brightness of the projection of the input device is further based on the area of the surface.

3. The method of claim 1, further comprising determining a selection of an object of the pattern of objects based at least in part on movement of the surface.

4. The method of claim 1, wherein providing the input device on the surface comprises projecting laser lines on the surface, the method further comprising:
receiving a given image of the input device depicting a discontinuity of at least one laser line of the laser lines projected on the surface, wherein the discontinuity of the at least one laser line is indicated by curvature of the at least one laser line; and
detecting selection of an object of the pattern of objects based on a location of the at least one laser line having the discontinuity.

5. The method of claim 1, further comprising determining that the input device is in use based on a comparison of the brightness level of the input device within the image of the input device to a predetermined brightness threshold.

6. The method of claim 1, further comprising adjusting, based on the approximate location of the surface, a direction of the projection of the input device so as to substantially provide the input device onto the surface while the surface is in motion.

7. A non-transitory computer readable medium having stored thereon instructions executable by a head-mountable computing device to cause the head-mountable computing device to perform functions comprising:
receiving information indicative of an amount of movement of the head-mountable computing device;
determining that the indicated amount of movement is within a range of movement associated with the head-mountable computing device being substantially stationary and responsively:

providing, by a projector coupled to the head-mountable computing device, a projected input device onto a surface, wherein the projected input device comprises a pattern of objects, and wherein the pattern of objects includes a plurality of regions;

receiving, from a camera coupled to the head-mountable computing device, an image of the projected input device;

determining an approximate location of the surface based on a brightness level of the projected input device within the image of the projected input device;

modifying a power of the projector to adjust the brightness level of the projected input device based on the brightness level indicating that a distance between the surface and the camera exceeds a predetermined threshold distance;

highlighting a first region of the plurality of regions;

detecting that a size of a second region increased relative to the first region; and highlighting the second region instead of the first region.

8. The non-transitory computer readable medium of claim 7, wherein the instructions are further executable by the head-mountable computing device to cause the head-mountable computing device to perform functions comprising:

determining, based on a location of the second region relative to the first region, whether the surface rotated or tilted.

9. A system comprising:

an image-capture device;

a projector; and a computing device in communication with the projector, wherein the computing device is configured to detect that the system is substantially stable and responsively:

cause the projector to provide a projected input device onto a surface, wherein the projected input device comprises a pattern of objects, and wherein the pattern of objects includes a plurality of regions;

receive from the image-capture device a reference background image including the projected input device;

determine an approximate location of the surface based on a brightness level of the projected input device within the reference background image;

modify a power of the projector to adjust the brightness level of the projected input device based on the brightness level indicating that a distance between the surface and the image-capture device exceeds a predetermined threshold distance;

highlighting a first region of the plurality of regions;

detecting that a size of a second region increased relative to the first region; and highlighting the second region instead of the first region.

10. The system of claim 9, wherein the computing device is further configured to cause the projector to change a direction of projection of the projected input device so as to substantially provide the projected input device onto the surface while the surface is in motion.

11. The system of claim 9, wherein the projector is configured to provide the projected input device onto a hand of a user.

12. The system of claim 11, wherein the pattern of objects includes a selector, and wherein the computing device is further configured to determine a hand gesture as a user selection of an object indicated by the selector.

13. The system of claim 12, wherein the hand gesture is making a fist.

14. The system of claim 9, further comprising:

a movement sensor coupled to the computing device, wherein the computing device is further configured to:

receive one or more outputs from the movement sensor indicating an amount of movement of the system, wherein the computing device is configured to detect that the system is substantially stable based on the one or more outputs indicating that the amount of movement is within a predetermined range of movement.

15. The system of claim 14, further comprising a head mounted device, wherein the projector and the image-capture device are coupled to the head mounted device.

16. The system of claim 9, wherein the computing device is further configured to:

generate a display of an input device on a display device coupled to the computing device; and receive a request to project the displayed input device onto the surface, wherein the computing device is configured to cause the projector to provide the projected input device onto the surface based on the request.

17. The system of claim 9, wherein the computing device is further configured to determine an area of the surface, wherein the computing device is configured to cause the projector to provide the projected input device onto the surface based on the area of the surface.

18. The system of claim 9, wherein the computing device is configured to determine an approximate location of the surface based on the reference background image, wherein the computing device is configured to modify the power of the projector to adjust the brightness level of the projected input device further based on the approximate location of the surface.

19. The system of claim 18, wherein the computing device is configured to cause the projector to provide the projected input device such that the projected input device has a given coverage area on the surface, wherein the given coverage area is based on the approximate location of the surface.

\* \* \* \* \*